United States Patent
Jinno

(10) Patent No.: US 11,516,562 B2
(45) Date of Patent: Nov. 29, 2022

(54) CORE SELECTIVE SWITCH AND OPTICAL NODE DEVICE

(71) Applicant: NATIONAL UNIVERSITY CORPORATION KAGAWA UNIVERSITY, Takamatsu (JP)

(72) Inventor: Masahiko Jinno, Kagawa (JP)

(73) Assignee: NATIONAL UNIVERSITY CORPORATION KAGAWA UNIVERSITY, Kagawa (JP)

( * ) Notice: Subject to any disclaimer, the term of this patent is extended or adjusted under 35 U.S.C. 154(b) by 0 days.

(21) Appl. No.: 17/433,974

(22) PCT Filed: Jan. 16, 2020

(86) PCT No.: PCT/JP2020/001366
§ 371 (c)(1),
(2) Date: Aug. 25, 2021

(87) PCT Pub. No.: WO2020/174919
PCT Pub. Date: Sep. 3, 2020

(65) Prior Publication Data
US 2022/0182741 A1 Jun. 9, 2022

(30) Foreign Application Priority Data
Feb. 27, 2019 (JP) .............................. JP2019-034602

(51) Int. Cl.
*H04Q 11/00* (2006.01)

(52) U.S. Cl.
CPC .. *H04Q 11/0005* (2013.01); *H04Q 2011/0024* (2013.01); *H04Q 2011/0041* (2013.01)

(58) Field of Classification Search
CPC ... H04Q 2011/0024; H04Q 2011/0026; H04Q 2011/003
See application file for complete search history.

(56) References Cited

U.S. PATENT DOCUMENTS

2002/0109076 A1 8/2002 Tochio et al.
2002/0164114 A1* 11/2002 Golub ................... G02B 6/356
356/330

(Continued)

FOREIGN PATENT DOCUMENTS

JP 2002-236264 A 8/2002
JP 2004-212829 A 7/2004

(Continued)

OTHER PUBLICATIONS

Deakin et al., "Design and Analysis of Beam Steering Multicore Fiber Optical Switches," in Journal of Lightwave Technology, vol. 37, No. 9, pp. 1954-1963, 1 May 1, 2019 (Date of Publication: Jan. 30, 2019), doi: 10.1109/JLT.2019.2896318. (Year: 2019).*

(Continued)

*Primary Examiner* — Nathan M Cors
(74) *Attorney, Agent, or Firm* — ArentFox Schiff LLP

(57) ABSTRACT

A core selective switch in an optical node device included in a spatial channel optical network includes a spatial demultiplexing unit, an optical switch, and an optical interconnect unit, wherein the spatial demultiplexing unit is an MCF collimator array in which a plurality of MCF collimators each comprising both an MCF having S cores and a collimator lens are two-dimensionally arranged in a plane, the optical switch is a variable reflection angle mirror array in which S variable reflection angle mirrors are two-dimensionally arranged in a plane in a manner similar to a core arrangement in the MCF, the optical interconnect unit is a steering lens, and a beam light output from each core of an input MCF is focused on a variable reflection angle mirror corresponding to the core to be reflected to couple to a corresponding core of a desired output MCF.

9 Claims, 28 Drawing Sheets

(56) References Cited

U.S. PATENT DOCUMENTS

| | | |
|---|---|---|
| 2003/0190113 A1 | 10/2003 | Huang et al. |
| 2015/0260920 A1 | 9/2015 | Ohtsuka |
| 2016/0286288 A1 | 9/2016 | Suzuki et al. |
| 2018/0063607 A1* | 3/2018 | Xia .................. H04J 14/04 |
| 2018/0278359 A1 | 9/2018 | Robertson et al. |

FOREIGN PATENT DOCUMENTS

| | | |
|---|---|---|
| JP | 2008-181149 A | 8/2008 |
| JP | 2010-124266 A | 6/2010 |
| JP | 2014-197154 A | 10/2014 |
| JP | 2015-094779 A | 5/2015 |
| JP | 2017-062390 A | 3/2017 |
| JP | 2017-156444 A | 9/2017 |
| JP | 2019-028164 A | 2/2019 |

OTHER PUBLICATIONS

Jung et al., "Compact 32-Core Multicore Fibre Isolator for High-Density Spatial Division Multiplexed Transmission," ECOC 2016; 42nd European Conference on Optical Communication, 2016, pp. 1-3. (Year: 2016).*

Jinno, M., "Spatial channel network (SCN) architecture employing growable and reliable spatial channel cross-connects toward massive SDM era," in Photonics in Switching and Computing (PSC) 2018, paper Fr3B.5, 2018.

International Search Report, issued by International Searching Authority in corresponding International Application No. PCT/JP2020/001366, dated Mar. 17, 2020.

Winzer, P. J., "Scaling optical fiber networks: challenges and solutions," Optics & Photonics News, pp. 28-35, Mar. 2015.

Marom, D. M. et al., "Switching solutions for WDM-SDM optical networks," IEEE Commun. Mag., vol. 53, No. 2, pp. 60-68, 2015.

Winzer, P. J. et al., "From scaling disparities to integrated parallelism: A decathlon for a decade," J. of Lightwave Technol., vol. 35, No. 5, pp. 1099-1115, 2017.

Saleh, A. A. M. et al., "Architectural principles of optical regional and metropolitan access networks," J. of Lightwave Technol., vol. 17, No. 12, pp. 2431-2448, 1999.

Communication from the European Patent Office in European Application No. 20763959.2, dated Sep. 27, 2022.

* cited by examiner

FIG.3
(a)
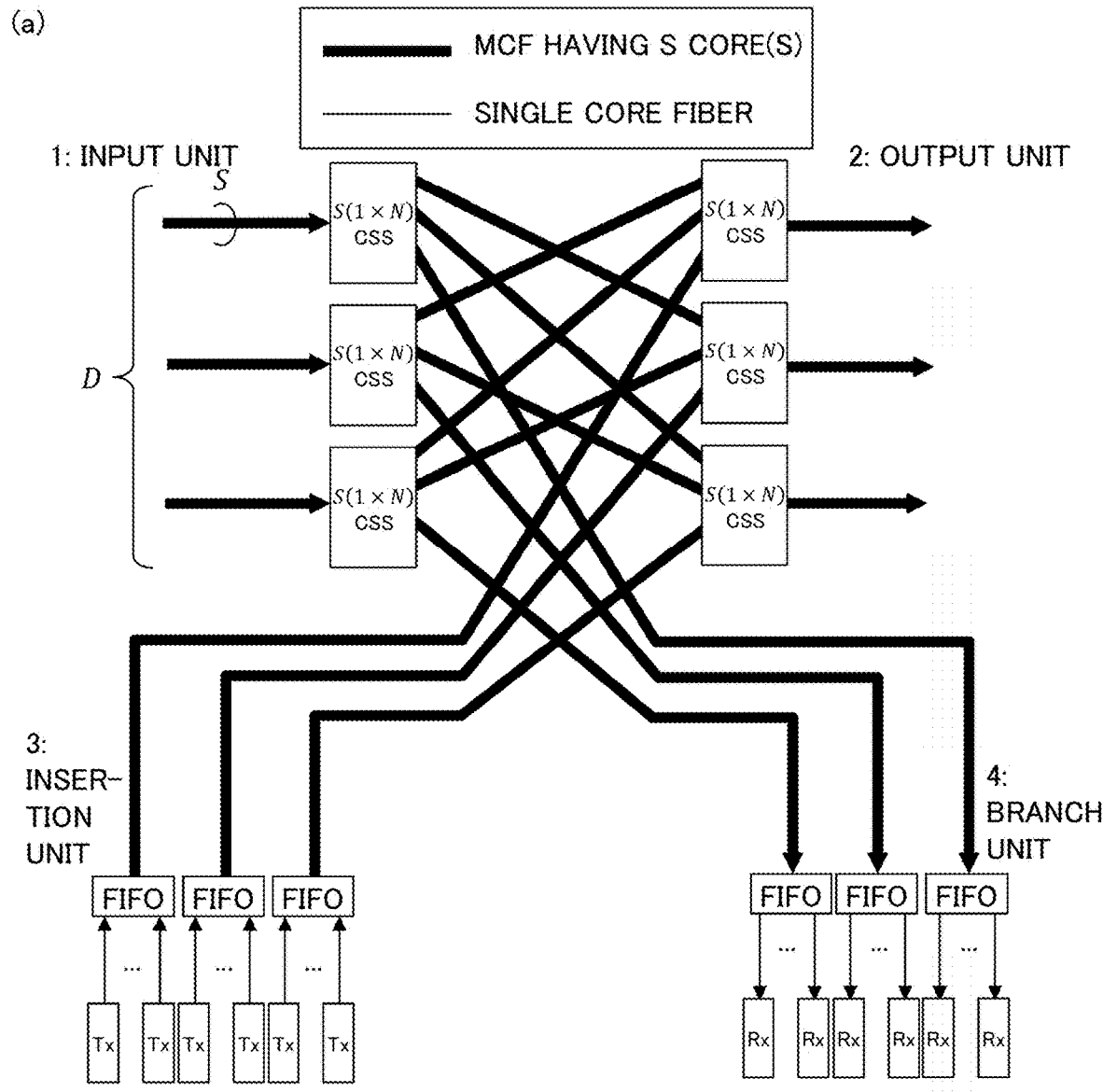
(b)
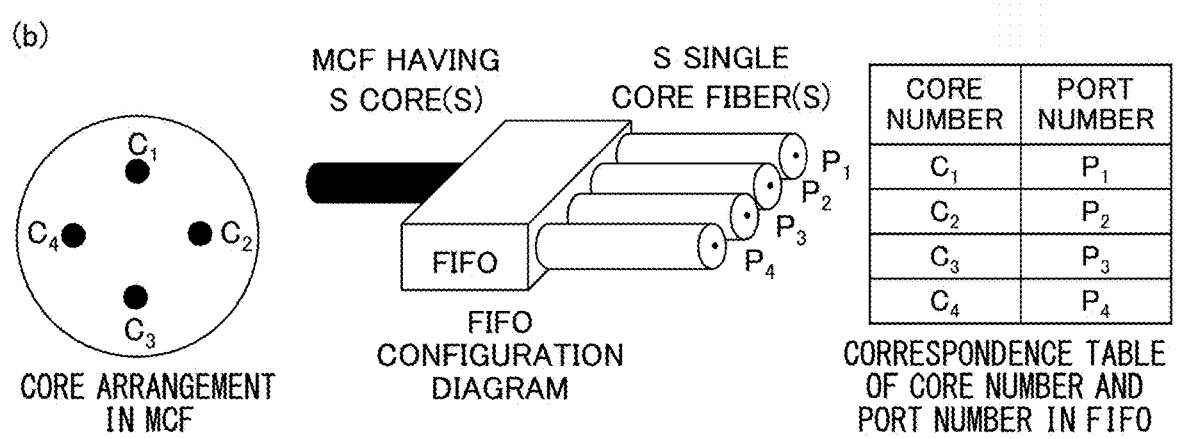

FIG.6
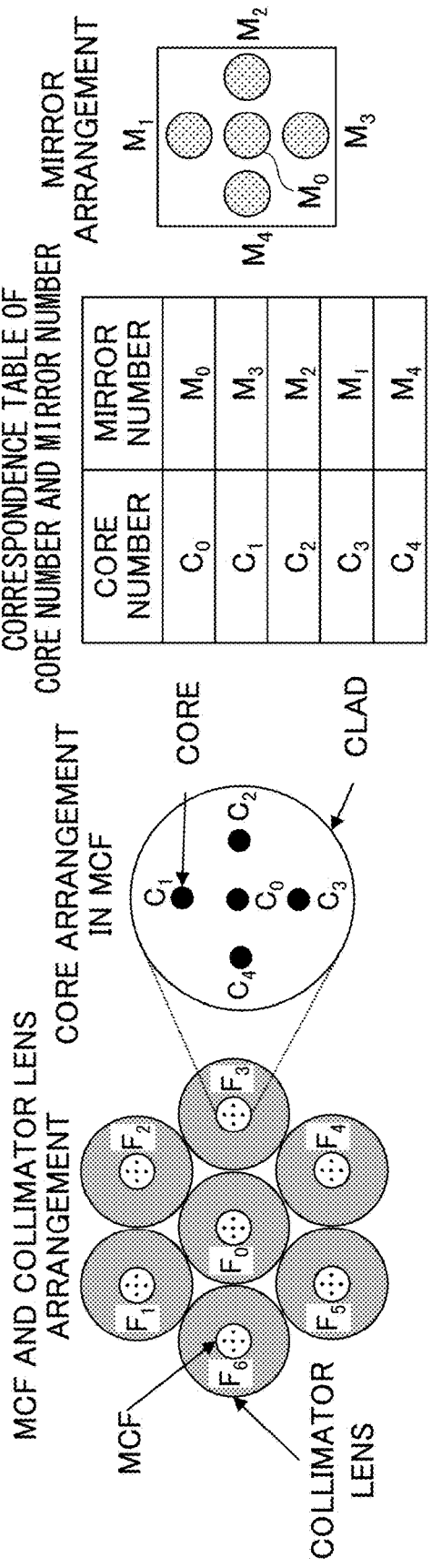
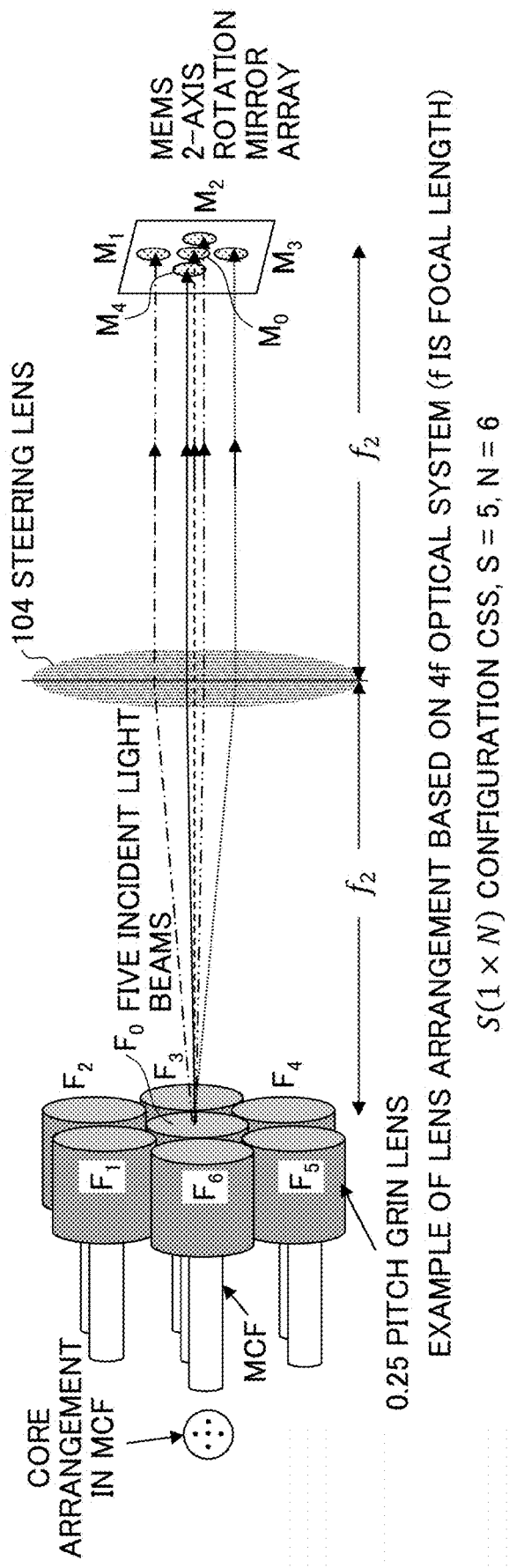

FIG.7
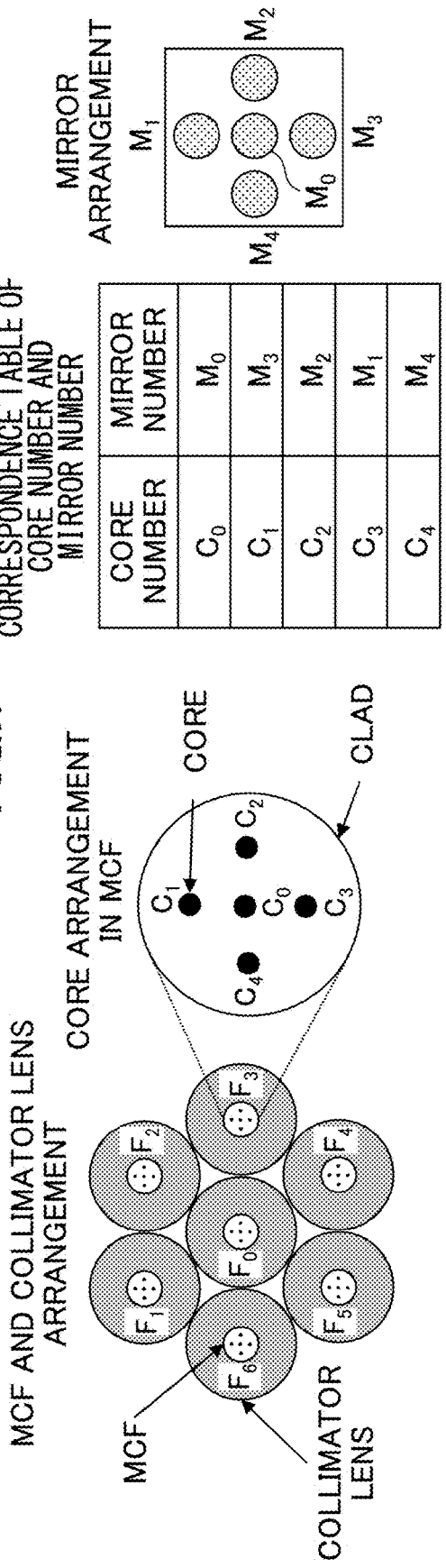
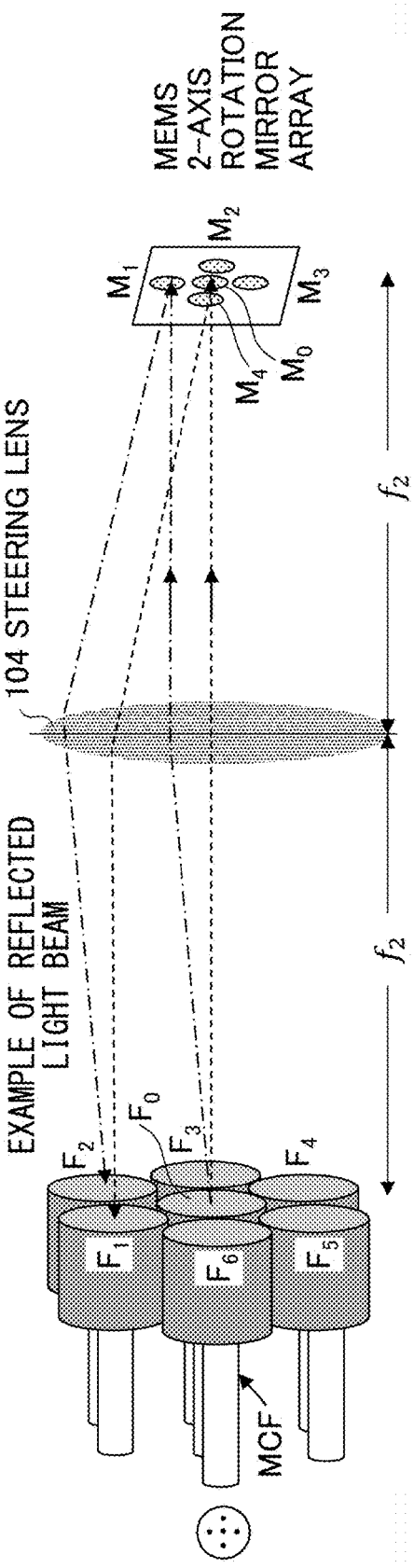

EXAMPLE OF POLARIZATION CONVERSION ELEMENT

FIG.10
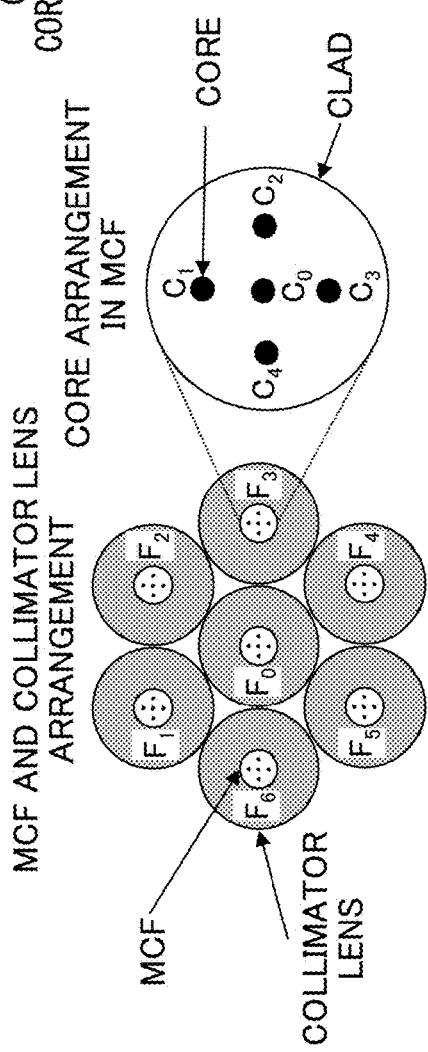
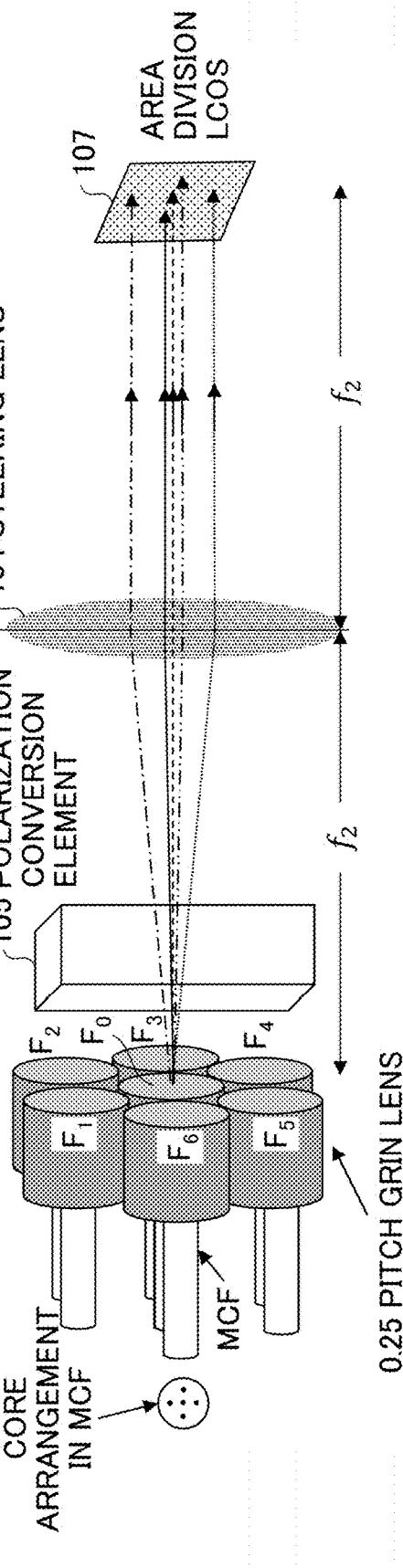

FIG.11
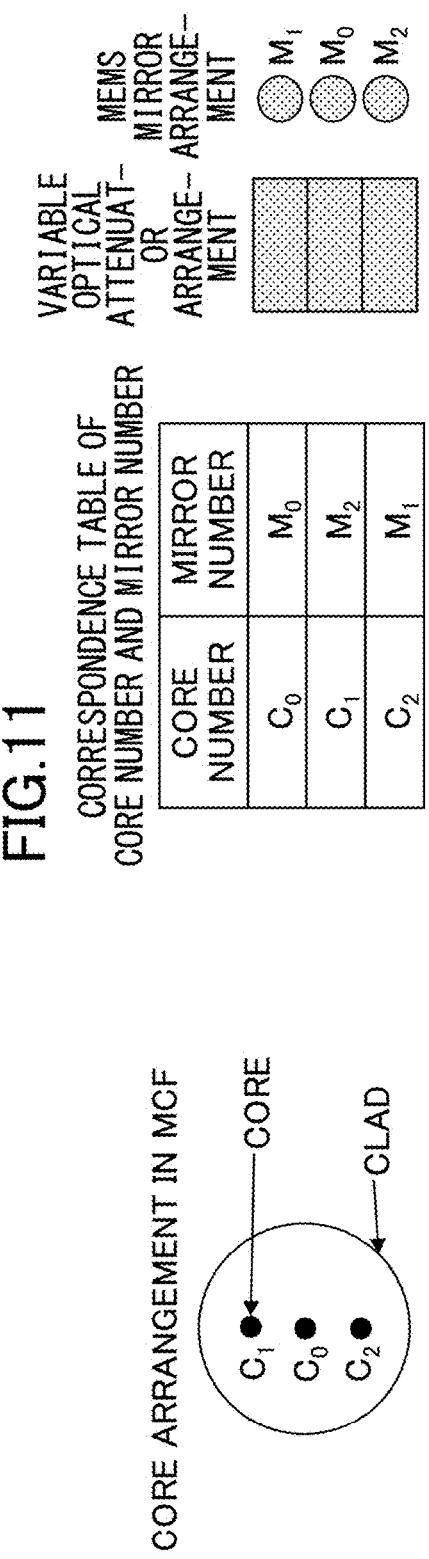
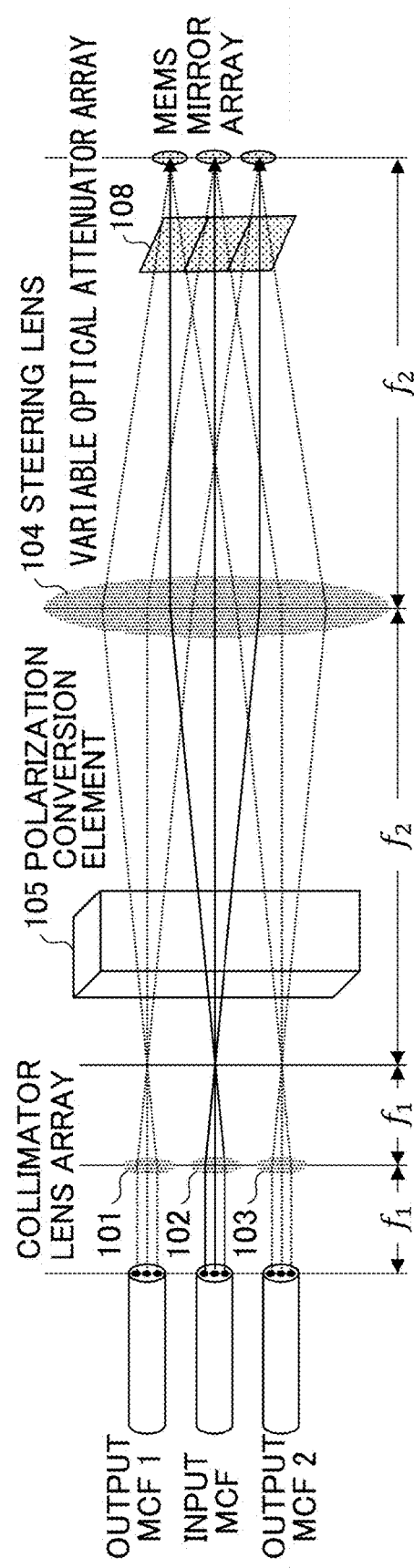

FIG.12
(a)
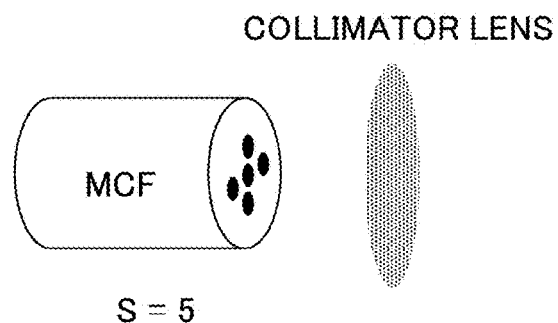
$S = 5$
(b)
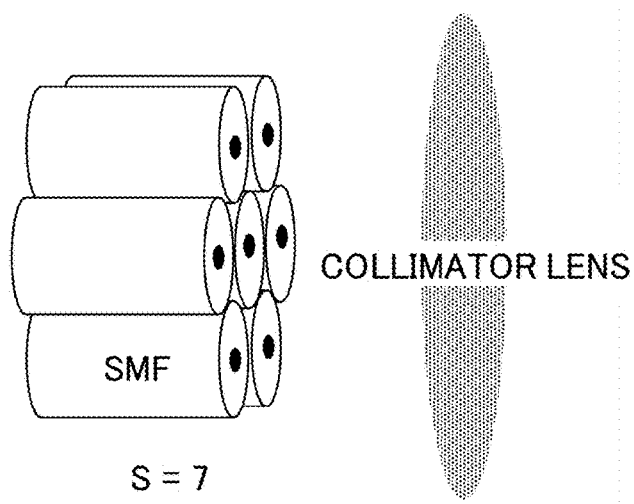
$S = 7$
(c)
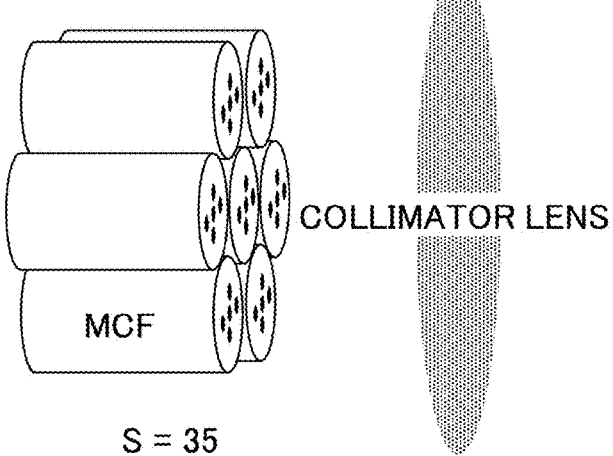
$S = 35$

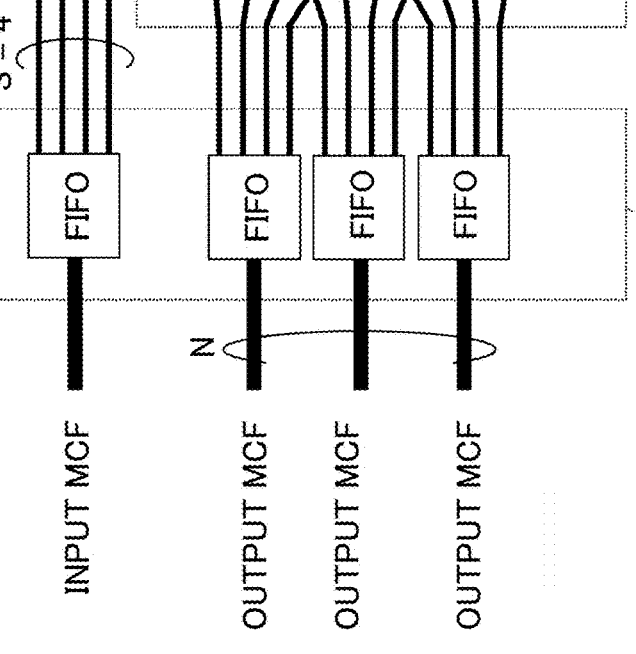
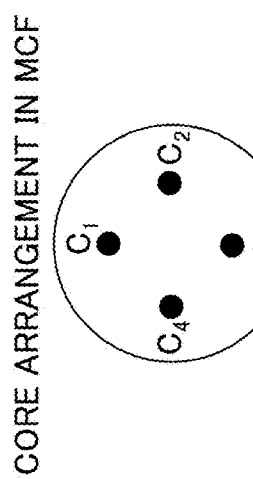
FIG.14

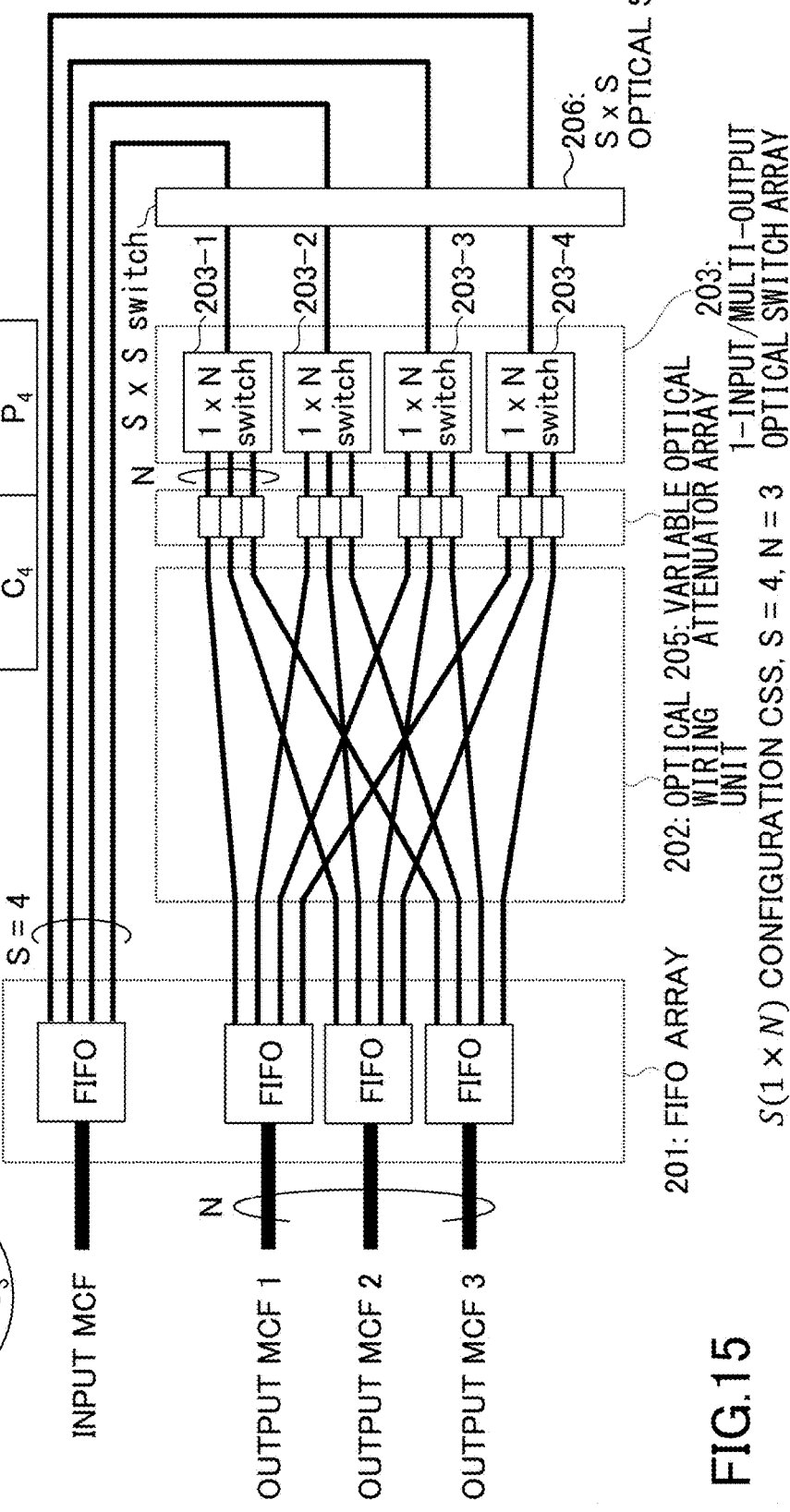
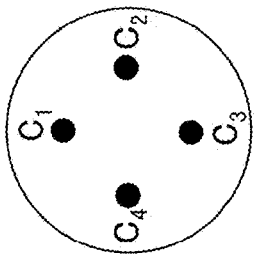
FIG.15

FIG.20
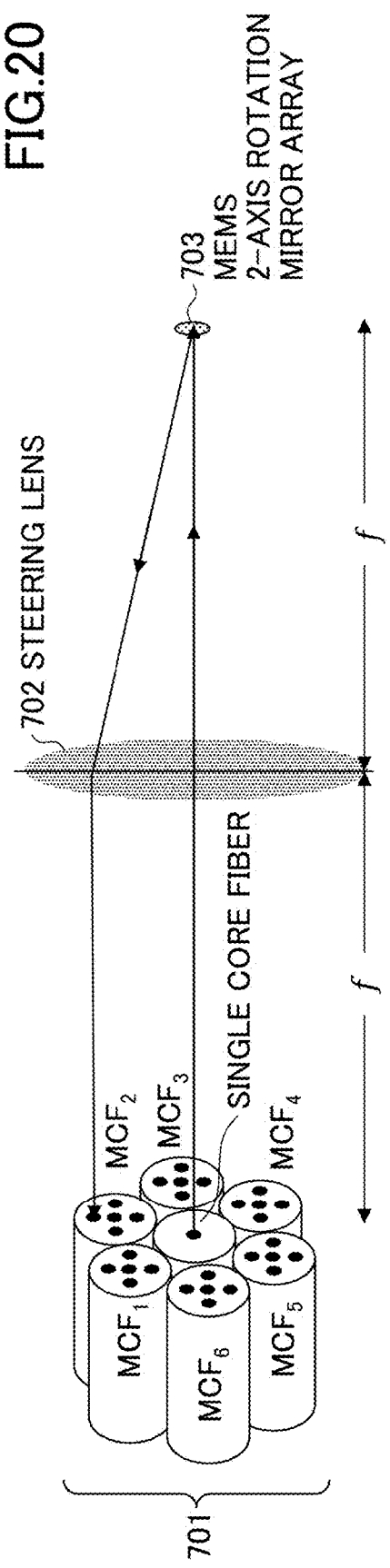
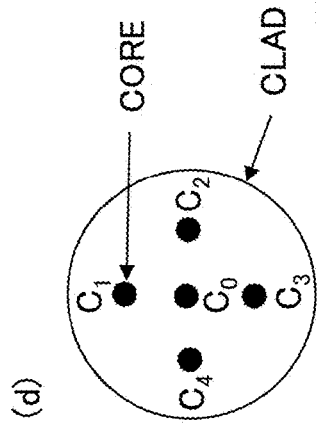
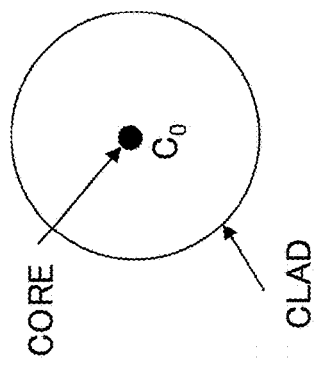
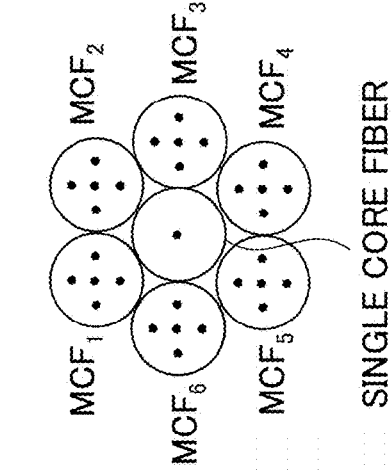
$1 \times$ SD CONFIGURATION CSS, S = 5, D = 6

FIG.25
CORRESPONDENCE TABLE OF CORE NUMBER AND PORT NUMBER IN FIFO
| CORE NUMBER | PORT NUMBER |
|---|---|
| $C_1$ | $P_1$ |
| $C_2$ | $P_2$ |
| $C_3$ | $P_3$ |
| $C_4$ | $P_4$ |
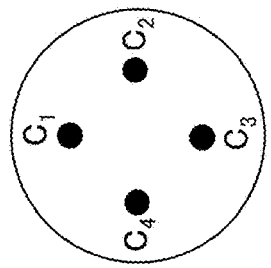
CORE ARRANGEMENT IN MCF
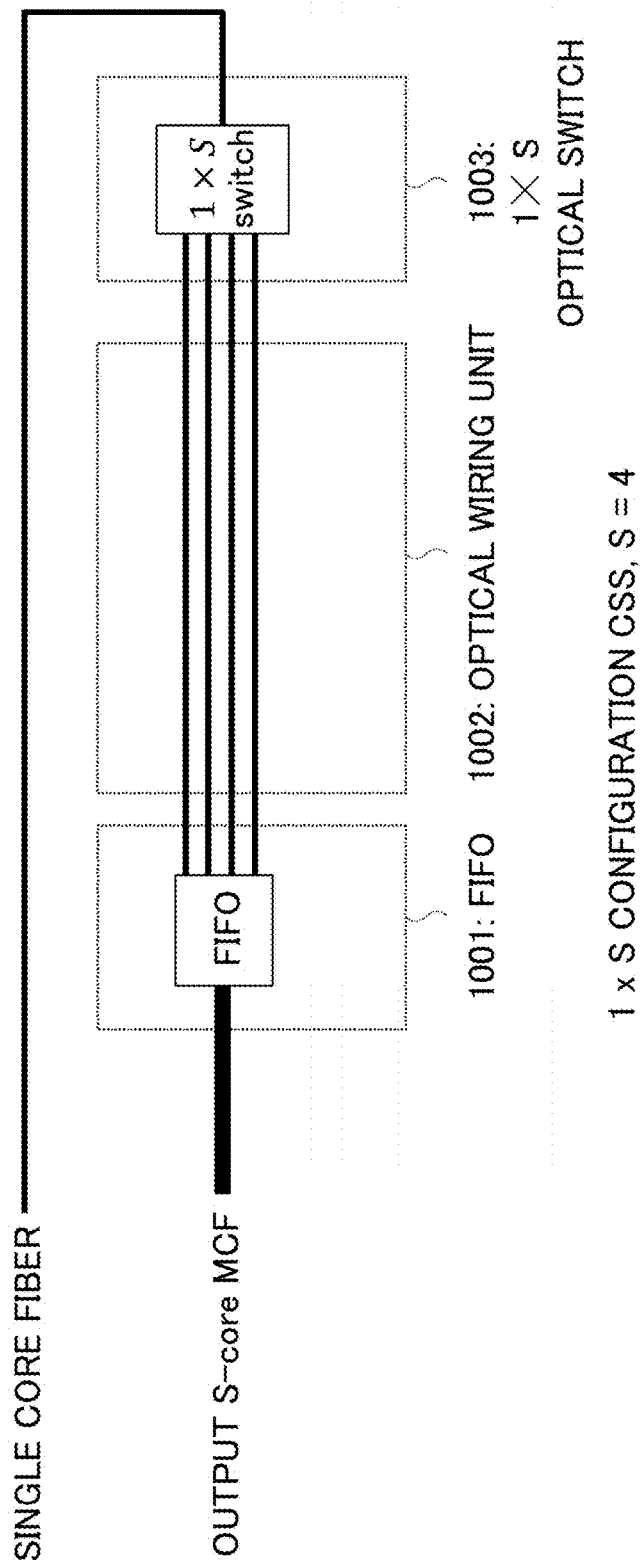
1 × S CONFIGURATION CSS, S = 4

CORE SELECTIVE SWITCH AND OPTICAL NODE DEVICE

CROSS-REFERENCE TO RELATED APPLICATIONS

The present application is a National Stage entry of International Application No. PCT/JP2020/001366, filed on Jan. 16, 2020, which claims priority to Japanese Patent Application No. 2019-034602, filed on Feb. 27, 2019. The disclosures of the prior applications are incorporated herein by reference in their entirety.

TECHNICAL FIELD

The present invention relates to a technique for implementing an optical node device that constitutes a spatial multiplex optical network to control a path according to spatial information of an optical signal.

BACKGROUND ART

Generally, a transmission line is capable of increasing its transmission capacity by increasing one or both of a transmission band and a signal-to-noise ratio. An optical fiber widely used in a long-distance optical fiber network has a single mode core formed in one optical fiber. This is called Single Mode Fiber (SMF), and its cross section is illustrated in FIG. 1(a). When the SMF is used in the transmission line, if a transmission optical power is increased by a certain amount or more for increasing the signal-to-noise ratio, waveform distortion due to nonlinear optical effects in the fiber core becomes significant. Therefore, there is an upper limit to the transmission optical power, so there is a physical limit to a capacity of a single SMF. For long-distance transmission applications, the total capacity of approximately 100 Tb/s is considered to be the upper limit.

On the other hand, the total capacity of the latest long-distance optical fiber communication system has already reached ~20 Tb/s.

Considering the trend of increasing Internet traffic by 20% to 40% annually, a common understanding has been developed that a new optical fiber technology is needed to replace the current single mode fiber (Non-Patent Document 1).

As new optical fibers, an optical fiber bundle (SMF-B: SMF Bundle) being used by bundling multiple SMFs, Uncoupled Multi Core Fiber (UC-MCF) in which multiple single mode cores without inter-core coupling (practically, inter-core coupling is small enough to be negligible) are arranged in a single optical fiber (FIG. 1(b)), Few Mode Fiber (FMF) capable of propagating several propagation modes with a single core (FIG. 1(c)), Coupled Core Fiber (CCF) capable of propagating multiple supermodes with a plurality of closely arranged single mode cores (FIG. 1(d)), and any combination of these configurations (FIG. 1(e), FIG. 1(f)) are proposed.

These fibers are generally referred to as Spatial Division Multiplexing (SDM) fibers because they multiplex a plurality of spatial propagation modes (multiple single mode cores in SMF-B and MCF, and multiple propagation modes in a multi mode core in FMF) along the spatial axis in the fiber bundle and in the fiber. The SDM fiber can transmit the number of optical channels represented by the product of the number of wavelength division multiplexing (WDM) wavelengths and the number of spatial propagation modes in a single spatial propagation mode. The SDM fibers are classified into two types, uncoupled type and coupled type, depending on the presence or absence of coupling between the spatial modes being propagated. If coupling exists between the propagation modes, crosstalk will occur between optical channels with different propagation modes but the same wavelength. In this case, multiple mixed optical channels of the same wavelength are separated by Multiple-Input-Multiple-Output (MIMO) processing. The SMF-B and the UC-MCF are classified as uncoupled types, and the FMF and the CC-MCF are classified as coupled types.

As an optical node device to be used in future optical networks made of such an SDM fiber, various optical node devices having multiplex/separation/path distribution functions on the wavelength axis and the spatial axis are proposed. The optical node device temporarily separates multiple optical channels connected to the optical node device, by spatial multiplexing and wavelength multiplexing, to multiplex lines into appropriate optical links by distributing them according to the final destination (Non-Patent Document 2).

On the other hand, interface speed of such as routers maintains a high growth rate of approximately 40% per year, and the IF speed of recent commercial router blades has reached 1.2 Tb/s (100 Gb/s×12). Therefore, a capacity of an optical interface for accommodating a high-speed client interface in the optical network also needs to be increased at an annual rate of 40%. Based on an extrapolation from optical interface speed of 100 Gb/s in 2010, the interface speed required for the optical transmission system is expected to exceed 10 Tb/s in 2024 (Non-Patent Document 3).

Also, a system capacity of the optical transmission system needs to be increased at an annual rate of 40%, the system capacity required for the optical transmission system is expected to be 1 Pb/s in 2024. Since this greatly exceeds the physical limit (~100 Tb/s) of the current single mode optical fiber capacity, a large number of spatial lanes are required between adjacent optical nodes. From the viewpoint of the technical difficulty and economic efficiency required to implement various SDM fibers, it is considered that the conventional SMF bundles or uncoupled MCFs will be used initially, and then multi mode cores will start to become more prevalent.

The DP-QPSK modulation 10 Tb/s optical signal, which is capable of being transmitted over a long distance, has at least 3.2 THz of optical spectrum. This means that, for example, only one optical channel can be accommodated in the full bandwidth (4.4 THz) of the C band. In this regard, a high-order modulation method with excellent frequency utilization efficiency may be used in exchange for a significant reduction in transmission distance. However, considering the interface speed increasing at an annual rate of 40%, the grace period obtained is at most a few years. Therefore, in the near future after 2024, not the optical node device described in Non-Patent Document 2 having multiplex/separation/path distribution functions on the wavelength axis and the spatial axis, but an optical node device that distributes paths only on the spatial axis will acquire economic and technical rationality.

CITATION LIST

Non-Patent Document

[Non-Patent Document 1] P. J. Winzer, "Scaling optical fiber networks: challenges and solutions," OPTICS & PHOTONICS NEWS, March 2015, pp. 28-35.

[Non-Patent Document 2] D. M. Marom and M. Blau, "Switching solutions for WDM-SDM optical networks," IEEE Commun. Mag., vol. 53, no. 2, pp. 60-68, 2015.

[Non-Patent Document 3] P. J Winzer and D. T Neilson, "From scaling disparities to integrated parallelism: A decathlon for a decade," J. of Lightwave Technol., vol. 35, no. 5, pp. 1099-1115, 2017.

[Non-Patent Document 4] A. A. M. Saleh and J. M. Simmons, "Architectural principles of optical regional and metropolitan access networks," J. of Lightwave Technol., vol. 17, no. 12, pp. 2431-2448, 1999.

[Non-Patent Document 5] M. Jinno, "Spatial channel network (SCN) architecture employing growable and reliable spatial channel cross-connects toward massive SDM era," in Photonics in Switching and Computing (PSC) 2018, paper Fr3B.5, 2018.

SUMMARY OF INVENTION

Technical Problem

FIG. 2 illustrates a fiber cross connect architecture based on the related art (Non-Patent Document 4), in which two ultra-multiport matrix switches are arranged in a redundant configuration in case of an optical switch failure. This configuration has the advantage providing a high degree of freedom of connection. However, the disadvantage is that two matrix switches of the maximum size are required, being expected to be necessary at the final phase of the system, from the beginning of the system implementation (initial capital investment is large). Further, it is necessary to provide each failure relief mechanism corresponding to the optical switch failure and the link failure, which increases equipment costs and time required for determining the failure point. The required size of the matrix switch is as below.

$$\lceil S_{max}D(1+d) \rceil \times \lceil S_{max}D(1+d) \rceil \quad \text{[Representation 1]}$$

Herein, $S_{max}$ is the maximum number of spatial lanes per link, and d is the ratio of the number of the input SCh terminated at that node.

$$\lceil \cdot \rceil \quad \text{[Representation 2]}$$

The above is the ceiling function. In addition to matrix switch, conventional WXCs are required for wavelength grooming at the WDM layer.

$$\lceil dgS \rceil \quad \text{[Representation 3]}$$

$\lceil dgS \rceil$ is the required number of the conventional WXCs. Herein, g is the ratio of the number of the terminated SCh connected to the WXC. For example, when $S_{max}=64$, $D=4$, $d=\frac{1}{4}$, and $g=\frac{1}{2}$, two 320×320 ultra-multiport matrix switches are required.

In order to avoid this problem, an optical node device based on a core selective switch as illustrated in FIG. 3 has been proposed (Non-Patent Document 5). As illustrated in FIG. 3, the optical node device includes an input unit 1, an output unit 2, an insertion unit 3, and a branch unit 4, and each component unit is connected by an MCF as illustrated.

Each core selective switch (CSS) constituting the input unit 1 includes one input MCF port having S core(s) and N output MCF port(s) having S core(s). The core selective switch is assumed to have a function that an optical signal propagated from a core of the input MCF port (core number a) is outputted to a core having the same core number a of any output MCF port. Hereinafter, the core selective switch having such a function will be referred to as a core selective switch with an S(1×N) configuration.

In the optical node device having this core selective switch, the number of core selective switches equal to the number of input/output route D (three in FIG. 3) is arranged in each of the input side (the input unit 1) and the output side (the output unit 2). As a result, the optical signal propagated from a certain core in a certain input route (input MCF) can be transmitted to the core having the same core number in an arbitrary output route (output MCF). Further, the optical signal inserted by the optical node device can be transmitted to a desired core of a desired output route (output MCF). Also, the optical signal propagated from the desired core of the desired input route (input MCF) of the optical node device can be branched and received.

This architecture includes modularity per link, connects active spatial optical channels and spare spatial optical channels to different output core selective switches, and assigns them to different paths. As a result, this architecture has a function available of relieving both the optical switch failure and the link failure by the spatial optical channel end switching mechanism. However, only a concept of an optical node based on the core selective switch has been proposed, and a specific method for implementing the core selective switch has not been developed.

Further, as illustrated in FIG. 3(b), the branch insertion unit (the branch unit 4, the insertion unit 3) of the optical node device described in Non-Patent Document 5 is configured by a Fan-in Fan-out (FIFO) component connecting a core of MCF having S core(s) to a core of S single core fiber(s). However, in this configuration, depending on which single core fiber of the insertion FIFO the transmitter (Tx) is connected to, the output MCF (output route of the optical signal) that outputs the output optical signal of the transmitter and the core to be used are fixed. Similarly, depending on which single core fiber of the branch FIFO the receiver (Rx) is connected to, the input MCF (input route of the optical signal) to which the input optical signal of the receiver has propagated and the core to be used are fixed. Therefore, in order to change the connection, physical replacing of the connection port of the transmitter/receiver is required, and there is a problem in that the degree of freedom of connection becomes low.

In general, it is desirable that the transmitter, by a remote operation, connected to the optical node device can be connected to any core of any output MCF (output route), and the receiver can be connected to any core of any input MCF (input route). An optical node device with the highest degree of freedom of connection and a core selective switch is capable of implementing this optical node device are desirable. However, there has been no specific method for implementing such an optical node device and a core selective switch.

The present invention has been made in view of the above points, and an object of the present invention is to provide a technology for implementing a core selective switch in an optical node device constituting a spatial channel optical network.

Solution to Problem

According to the present disclosure, a core selective switch in an optical node device included in a spatial channel optical network includes a spatial demultiplexing unit, an optical switch, and an optical interconnect unit, wherein the spatial demultiplexing unit is an MCF collimator array in which a plurality of MCF collimators each comprising both an MCF having S cores and a collimator lens are two-dimensionally arranged in a plane, the optical switch is a variable reflection angle mirror array in which S variable reflection angle mirrors are two-dimensionally arranged in a plane in a manner similar to a core arrangement in the MCF, the optical interconnect unit is a steering lens arranged between the MCF collimator and the variable reflection angle mirror array, and among a plurality of said MCFs in the MCF collimator array, a beam light output from each core of an input MCF is focused on a variable reflection angle mirror corresponding to the core to be reflected to couple to a corresponding core of a desired output MCF is provided.

Advantageous Effects of Invention

According to disclosed technology, a technology for implementing a core selective switch in an optical node device constituting a spatial channel optical network is provided.

BRIEF DESCRIPTION OF DRAWINGS

FIG. 3 is a diagram illustrating a configuration example of the optical node device based on a core selective switch.
FIG. 6 is a diagram illustrating a core selective switch of Embodiment 3.
FIG. 7 is a diagram illustrating a core selective switch of Embodiment 3.
FIG. 10 is a diagram illustrating a core selective switch of Embodiment 5.
FIG. 11 is a diagram illustrating a core selective switch of Embodiment 6.
FIG. 12 is a diagram illustrating an example of a fiber collimator.
FIG. 14 is a diagram illustrating a core selective switch of Embodiment 10.
FIG. 15 is a diagram illustrating a core selective switch of Embodiment 11.
FIG. 20 is a diagram illustrating a core selective switch of Embodiment 15.
FIG. 25 is a diagram illustrating a core selective switch of Embodiment 19.

DESCRIPTION OF EMBODIMENTS

Figure 1:
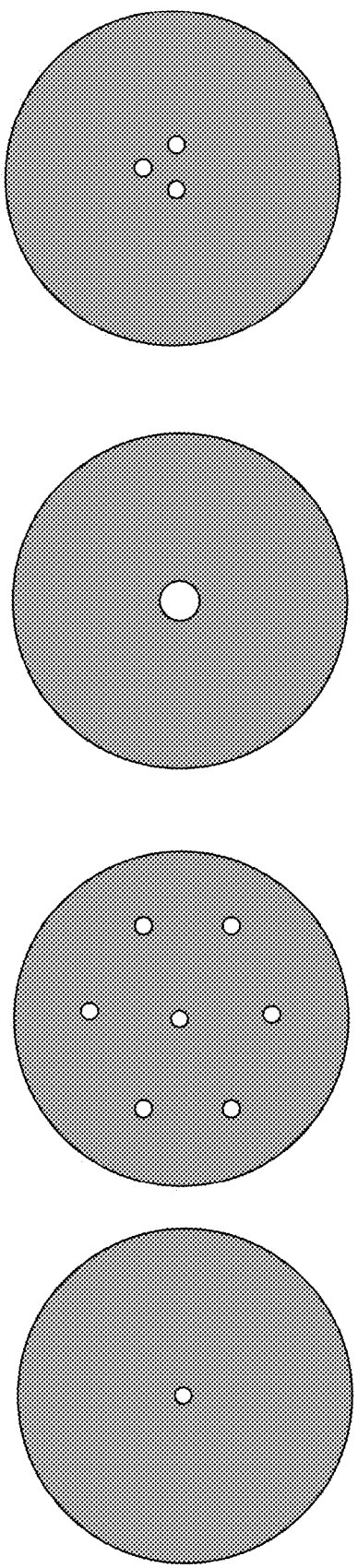
FIG. 1 is a diagram illustrating an example of an optical fiber.
Figure 2:
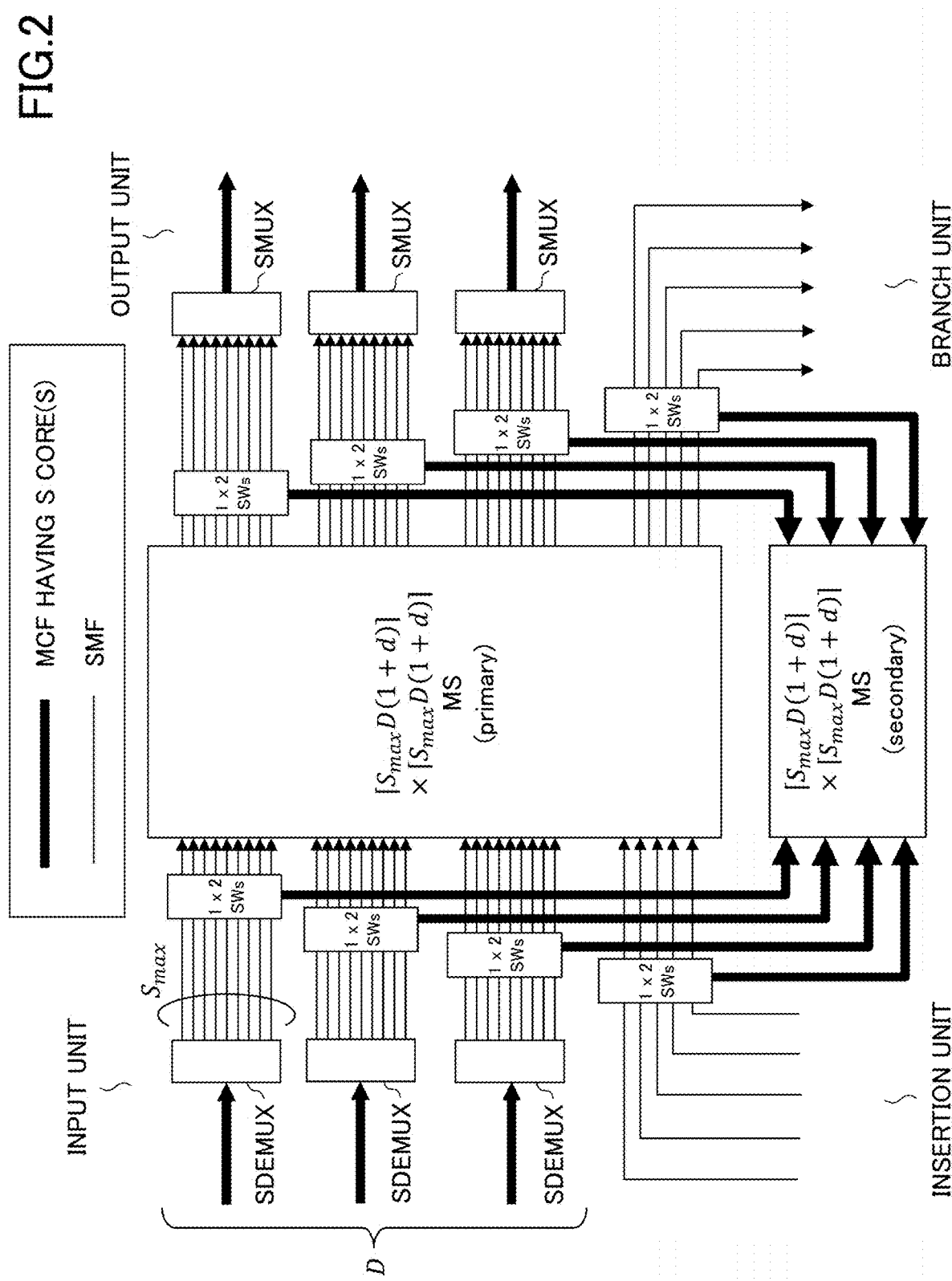
FIG. 2 is a diagram illustrating a configuration example of an optical node device based on a conventional optical matrix switch.

Hereinafter, embodiments according to the present invention will be described with reference to the drawings. It should be noted that the embodiments described below are merely examples, and the embodiments to which the present invention is applied are not limited to the following embodiments.

In the following description, an input MCF, an output MCF, etc. are described using "input" and "output", but for convenience, "input" and "output" are used assuming either the input unit or the output unit, or the insertion unit or the branch unit, and are used assuming the direction of light when used for that purpose. For example, the core selective switch described as the input unit or the insertion unit can be applied to the output unit or the branch unit.

Further, in the following description, a part of an optical fiber connected to the optical fiber of a transmission line such as the input MCF and the output MCF is described as a component of the core selective switch, but a part not including the input MCF, the output MCF may be referred to as a core selective switch.

In addition, various technical matters described in Embodiment 1 to Embodiment 22 below may be implemented in any combination as long as there is no contradiction.

Further, S, D, M, and N used below are each an integer of 0 or more. Each core of the MCF may be a single-mode core capable of propagating only a single mode, or a multi-mode core capable of propagating multiple modes at the same time. Further, the MCF may be multiple single core fibers or an optical fiber bundle in which multiple MCFs are bundled.

(Overview of Core Selective Switch)

Hereinafter, in an optical node device constituting a spatial channel optical network as illustrated in FIG. 3, for example, a core selective switch constituting an input unit 1 and an output unit 2 on a transmission side will be described. Herein, an outline will be described, and then a specific configuration will be described with reference to Embodiments.

The core selective switch includes a spatial demultiplexing unit, an optical switch, and an optical interconnect unit. The spatial demultiplexing unit is an MCF collimator array in which multiple MCF collimators comprising an MCF having S core(s) and a collimator lens are arranged in a straight line or a plane.

The optical switch is a variable reflection angle mirror array in which S variable reflection angle mirror(s) are arranged in a manner similar to the core arrangement in the MCF.

An optical interconnect unit is a steering lens arranged between the MCF collimator array and the variable reflection angle mirror array. By using the steering lens, a light beam output from each core of the input MCF is reflected so as to couple to the corresponding core of the desired output MCF after focusing on the variable reflection angle mirror associated with the core. An embodiment of the core selective switch will be described below. Hereinafter, the core selective switch is referred to as the CSS.

Embodiment 1

Figure 4:
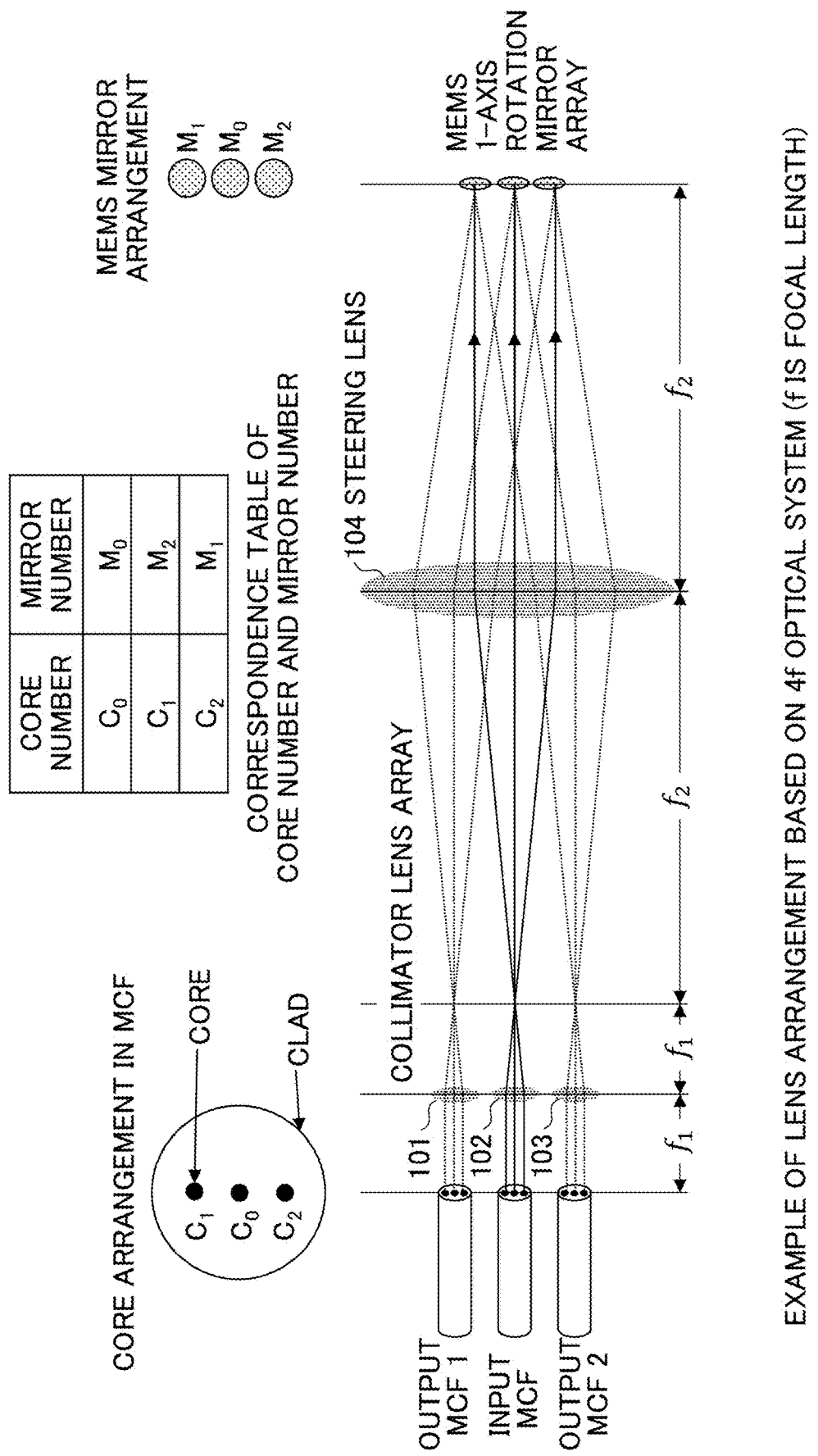
FIG. 4 is a diagram illustrating a core selective switch of Embodiment 1.

FIG. 4 illustrates a CSS of Embodiment 1. The CSS of Embodiment 1 is a three-core (one input, two outputs) CSS, which is an example of a one-dimensional arrangement CSS. In Embodiment 1, since S=3 and N=2, it is expressed as 3(1×2) configuration CSS according to a notation of the S(1×N) configuration CSS.

In the CSS of Embodiment 1, an input MCF, output MCFs 1 and 2, and collimator lenses 101 to 103 are provided as the spatial demultiplexing unit. A total of N+1 (=3) collimator lenses 101 to 103 constitutes a collimator lens array. Each collimator lens is a convex lens with a focal length of $f_1$. The collimator lens 101 is at a location facing the output MCF1, the collimator lens 102 is at a location facing the input MCF, and the collimator lens 103 is at a location facing the output MCF2.

As illustrated, each MCF includes three cores ($C_1$, $C_0$, $C_2$), and each core is a single-mode core. The three cores are arranged in a straight line in the vertical direction in the figure, and the three MCFs and the collimator lens are also arranged in a straight line in the vertical direction.

As illustrated in FIG. 4, a steering lens 104 is provided as the optical interconnect unit. The steering lens 104 is a convex lens with a focal length of $f_2$. Further, as an optical switch, three MEMS mirrors ($M_1$, $M_0$, $M_2$) corresponding to the number of core S are provided on a straight line in the vertical direction in the figure in a manner similar to the core arrangement of magnification of $f_2/f_1$. When an MCF side is viewed from the side of the MEMS mirrors in the figure, the three MCFs and their cores, the collimator lenses 101, 102, and 103, and the three MEMS mirrors ($M_1$, $M_0$, $M_2$) appear to be arranged in a straight line.

Each MEMS mirror is a MEMS 1-axis rotation mirror in which a reflection angle of light is variable in the vertical direction. Further, each of the MEMS mirrors $M_1$, $M_0$, and $M_2$ are associated with the cores $C_2$, $C_0$, and $C_1$ of each MCFs.

In the CSS of Embodiment 1, a convex lens with a focal length $f_1$ is used for the collimator lens, and a convex lens with a focal length $f_2$ is used for the steering lens, so that the optical arrangement is a 4f arrangement.

In the CSS of Embodiment 1, the light beam output from the core $C_1$ of the input MCF is focused and reflected on the MEMS mirror $M_2$ via the collimator lens 102 and the steering lens 104. The light beam reflected from the MEMS mirror $M_2$ is incident so as to be coupled to the core $C_1$ of the output MCF1 or the output MCF2 according to the mirror angle. The light beam output from the core $C_0$ of the input MCF is focused and reflected on the MEMS mirror $M_0$ via the collimator lens array 102 and the steering lens 104. The light beam reflected from the MEMS mirror $M_0$ is incident so as to be coupled to the core $C_0$ of the output MCF1 or the output MCF2 according to the mirror angle. The light beam output from the core $C_2$ of the input MCF is focused and reflected on the MEMS mirror $M_1$ via the collimator lens array 102 and the steering lens 104. The light beam reflected from the MEMS mirror $M_1$ is incident so as to be coupled to the core $C_2$ of the output MCF1 or the output MCF2 according to the mirror angle.

Embodiment 2

Figure 5:
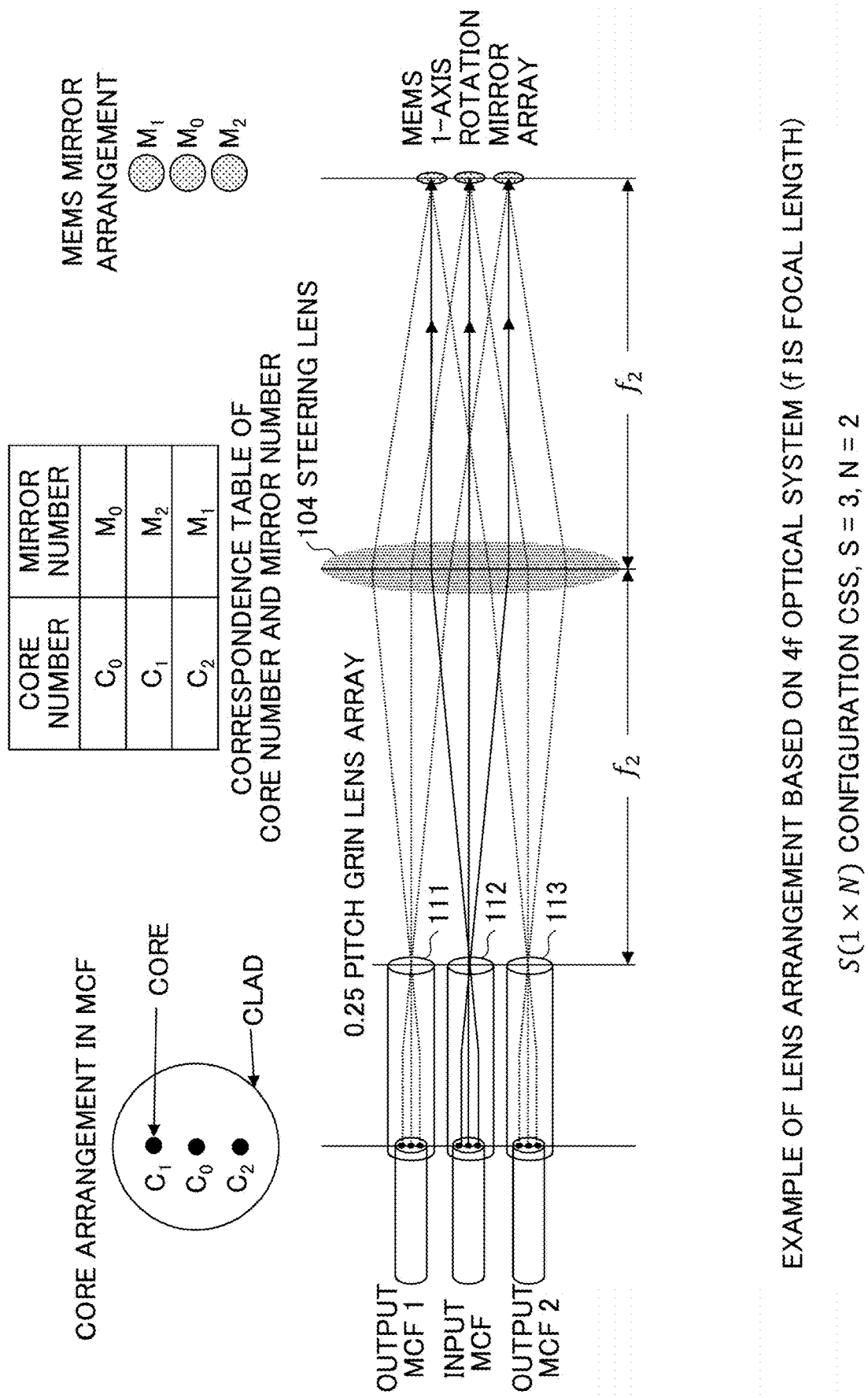
FIG. 5 is a diagram illustrating a core selective switch of Embodiment 2.

FIG. 5 illustrates a CSS of Embodiment 2. The CSS of Embodiment 2 is, as the CSS of Embodiment 1, a three-core (one input, two outputs) CSS, which is an example of a one-dimensional arrangement CSS. However, in Embodiment 2, instead of the collimator lenses 101 to 103 of Embodiment 1, 0.25 pitch GRIN (Graded-Index) lenses 111 to 113 (constituting an array) with an effective focal length $f_1$ are used by the CSS. Configurations other than the 0.25 pitch GRIN lenses 111 to 113 are the same in Embodiment 1 and Embodiment 2. The 0.25 pitch GRIN lens may be considered as a kind of collimator lens, and the 0.25 pitch GRIN lens may be referred to as a collimator lens.

The GRIN lens is a refractive index distribution type lens, and as illustrated in FIG. 5, has a light collecting function as a lens by continuously changing a refractive index in the glass while input and output surfaces are flat. The end side of the GRIN lens on the MCF side is connected to the MCF.

The input and output of the light beam are the same as in Embodiment 1. For example, the light beam output from the core $C_1$ of the input MCF is focused and reflected on the MEMS mirror $M_2$ via the GRIN lens 112 and the steering lens 104. The light beam reflected from the MEMS mirror $M_2$ is incident so as to be coupled to the core $C_1$ of the output MCF1 or the output MCF2 according to the mirror angle. The light beam output from the core $C_0$ of the input MCF and the light beam output from the core $C_2$ of the input MCF is same as in Embodiment 1.

Embodiment 3

Next, a CSS of Embodiment 3 will be described with reference to FIG. 6 to FIG. 7. The CSS of Embodiment 3 is arranged in a two-dimensional arrangement of N+1 (=7) MCF collimators comprising the MCF and the collimator lens (the 0.25 pitch GRIN lens array with the effective focal length f1) on the plane. This is an example of a five-core (one input, six outputs) CSS, and is expressed as 5(1×6) configuration CSS. "On the plane" means that the end side of the MCF and the end side of the 0.25 pitch GRIN lens array are arranged in a plane perpendicular to the optical axis of the center of the steering lens 104. In Embodiment 3, the same 0.25 pitch GRIN lens array as in Embodiment 2 is used in the spatial demultiplexing unit, but this is just an example, and the same collimator lens array as in Embodiment 1 may be used.

As illustrated in FIG. 6 (FIG. 7), seven 0.25 pitch GRIN lenses with an effective focal length f1 are provided, each of which is connected to the MCF. Of the seven 0.25 pitch GRIN lenses, one 0.25 pitch GRIN lens (connected to the MCF of F0) is arranged at the center and six 0.25 pitch GRIN lenses (connected to MCFs F1 to F6) are arranged around the one lens so as to form a hexagon. Each MCF includes five cores, $C_0$ to $C_5$.

As illustrated in FIG. 6 (FIG. 7), a steering lens 104, which is a convex lens with a focal length $f_2$, is provided as the optical interconnect unit. Further, as the optical switch, five MEMS mirrors ($M_1$, $M_2$, $M_3$, $M_4$, $M_0$) having the same number of core(s) S are provided in a plane (parallel to the plane on which the end side of the MCF is arranged) in a manner similar to the core arrangement of the magnification of $f_2/f_1$. Each MEMS mirror is a MEMS 2-axis rotation mirror with a variable angle of reflection of the light in the vertical and horizontal directions. Further, each of the MEMS mirrors $M_1$, $M_2$, $M_3$, $M_4$, and $M_0$ are associated with the cores $C_3$, $C_2$, $C_1$, $C_4$, and $C_0$ of each MCF.

Any of the seven MCFs may be input MCFs, but herein, the central MCF is used as the input MCF, and the surrounding six MCFs are used as the output MCFs as an example.

As illustrated in FIG. 6 and FIG. 7, for example, the light beam output from the core $C_0$ of the input MCF is focused and reflected on the MEMS mirror $M_0$ via the 0.25 pitch GRIN lens and the steering lens 104. The light beam reflected from the MEMS mirror $M_0$ is incident so as to be coupled to the core $C_0$ of the output MCF of $F_1$. Further, for example, the light beam output from the core $C_3$ of the input MCF is focused and reflected on the MEMS mirror $M_1$ via the 0.25 pitch GRIN lens and the steering lens 104. The light beam reflected from the MEMS mirror $M_1$ is an incident so as to be coupled to the core $C_3$ of the output MCF of $F_2$.

Embodiment 4

Figure 8:
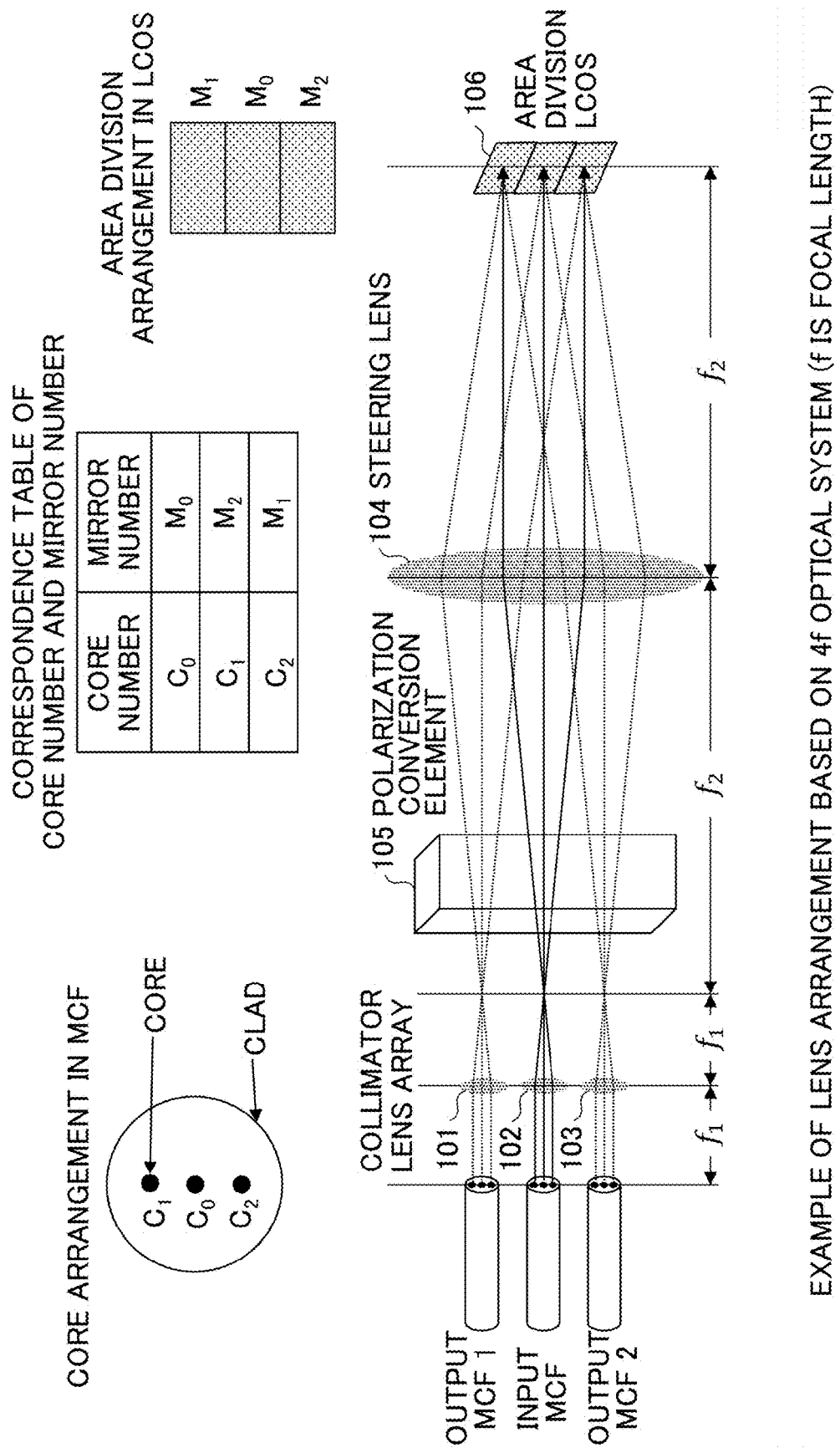
FIG. 8 is a diagram illustrating a core selective switch of Embodiment 4.

FIG. 8 illustrates a CSS of Embodiment 4. The CSS of Embodiment 4 uses a Liquid Crystal on Silicon (LCOS) spatial modulator instead of the MEMS mirror of Embodiment 1, and a polarization diversity optical system (specifically, a polarization conversion element 105) is arranged between the collimator lens array (the collimator lenses 101 to 103) and the steering lens 104. Since the LCOS spatial modulator is a polarization wave dependent device, a polarization diversity optical system is arranged. Note that FIG. 8 illustrates an example in which the LCOS spatial modulator and the polarization diversity optical system are introduced into the CSS of Embodiment 1, but the LCOS spatial modulator and the polarization diversity optical system may be introduced into the CSS in all other embodiments of the spatial optical systems.

Figure 9:
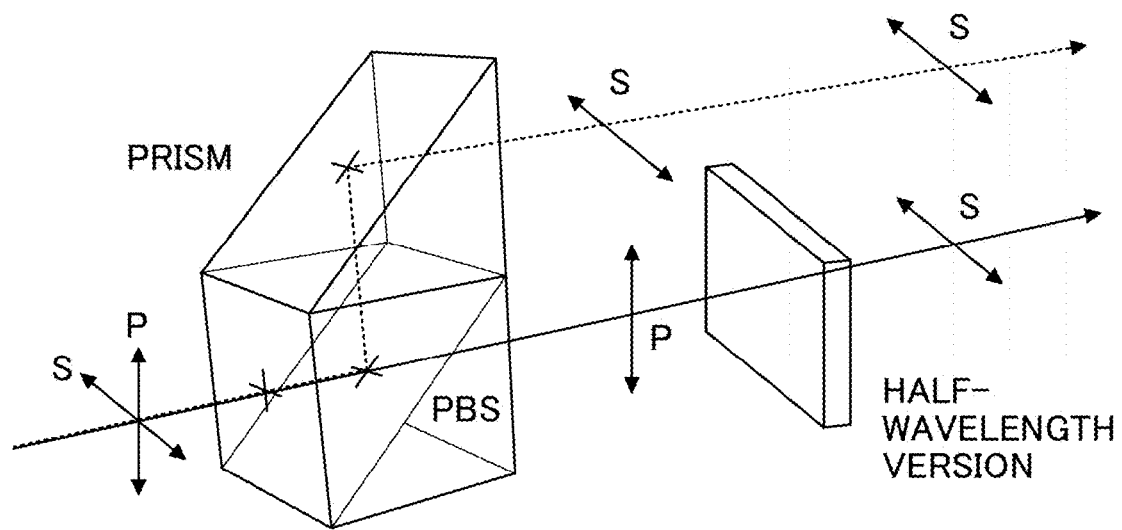
FIG. 9 is a diagram illustrating an example of a polarization conversion element.

As illustrated in FIG. 8, the LCOS spatial modulator 106 used in the CSS of Embodiment 4 is an area division LCOS spatial modulator divided into three areas $M_1$ to $M_3$. Further, as illustrated in FIG. 9, the polarization conversion element 105 includes a Polarization Beam Splitter (PBS), a prism, and a half-wavelength plate. The configuration illustrated in FIG. 9 is an example of a configuration of the polarization conversion element, and another configuration may be used as long as the same function can be obtained.

In the CSS of Embodiment 4, the light beam output from the core $C_1$ of the input MCF is focused and reflected in the area $M_2$ of the LCOS spatial modulator via the collimator lens 102 and the steering lens 104. The light beam reflected from the area $M_2$ of the LCOS spatial modulator is incident so as to couple to the core $C_1$ of the desired output MCF (the output MCF1 or the output MCF2). The same applies to the light beam output from the core $C_0$ of the input MCF and the light beam output from the core $C_2$ of the input MCF.

Embodiment 5

FIG. 10 illustrates a CSS of Embodiment 5. The CSS of Embodiment 5 uses an LCOS spatial modulator instead of the MEMS mirror of Embodiment 3 (five-core CSS (one input, six outputs) arranged in two-dimensional arrangement), and a polarization diversity optical system (specifically, a polarization conversion element 105) is arranged between the 0.25 pitch GRIN lens array and the steering lens 104. As illustrated in FIG. 10, the LCOS spatial modulator 107 is divided into five areas ($M_3$, $M_2$, $M_1$, $M_4$, $M_0$) corresponding to the five cores ($C_1$, $C_2$, $C_3$, $C_4$, $C_0$), and each performs the same role as the MEMS mirror in Embodiment 3.

Embodiment 6

FIG. 11 illustrates a CSS of Embodiment 6. The CSS of Embodiment 6 includes, in addition to the CSS of Embodiment 1, a variable optical attenuator array 108, which is an output power adjustment mechanism, between the steering lens 104 and the MEMS mirror array (immediately before the MEMS mirror array). Since the variable optical attenuator in the present embodiment is liquid crystal-based and has polarization dependence, a polarization conversion element 105 is provided.

As illustrated in FIG. 11, the variable optical attenuator array 108 includes an area corresponding to each MEMS mirror. An intensity of the light beam reflected from the MEMS mirror is adjusted (attenuated) by passing through the area of the corresponding variable optical attenuator. This allows adjustment of the intensities of multiple light beams coupled to the output MCF. A monitoring mechanism for measuring the intensity of the light may be provided, for example, between the collimator lens array and the polarization conversion element 105, or between the MCF and the collimator lens array.

The configuration with the variable optical attenuator may be applied in the CSS described in all other embodiments.

Embodiment 7, Embodiment 8

Regarding the MCF used as the input MCF and the output MCF of the core selective switch of Embodiments 1 to 6, an example using a general MCF (S=5) as illustrated in FIG. 12(*a*) (the fiber collimator in Embodiment 1) has been described. As described previously, each core of the MCF may be a single-mode core or a multi-mode core.

Instead, in Embodiment 7, as illustrated in FIG. 12(*b*), multiple single core fibers arranged in a plane (a single core fiber bundle (SMF bundle)) are used. In this case, the number of core(s) S is seven, and seven mirrors with variable reflection angles corresponding to the number of core(s) S are provided in a manner similar to the core arrangement of magnification $f_2/f_1$. Although FIG. 12(*b*) illustrates an example in which the collimator lens is used as the spatial demultiplexing unit, the single core fiber bundle may also be used when the 0.25 pitch GRIN lens is used. The single core fiber bundle in which multiple single core fibers are arranged in a straight line may be used. Note that the single core fiber used for the single core fiber bundle may be either SMF or FMF.

Further, in Embodiment 8, as illustrated in FIG. 12(*c*), multiple MCFs arranged in a plane (an MCF bundle) are used instead of the MCF used in Embodiments 1 to 6. In this case, the number of cores S is 35, and 35 mirrors with variable reflection angles corresponding to the number of core(s) S are provided in a manner similar to the core arrangement of magnification $f_2/f_1$. Although FIG. 12(*c*) illustrates an example in which the collimator lens is used as the spatial demultiplexing unit, the MCF bundle may also be used when the 0.25 pitch GRIN lens is used. The MCF bundle in which multiple MCFs are arranged in a straight line may be used. Note that the MCF used for the MCF bundle may be either single-mode MCF or multi-mode MCF.

Note that the single core fiber bundle or the MCF bundle may be applied in the CSS described in all other embodiments.

Embodiment 9

Figure 13:
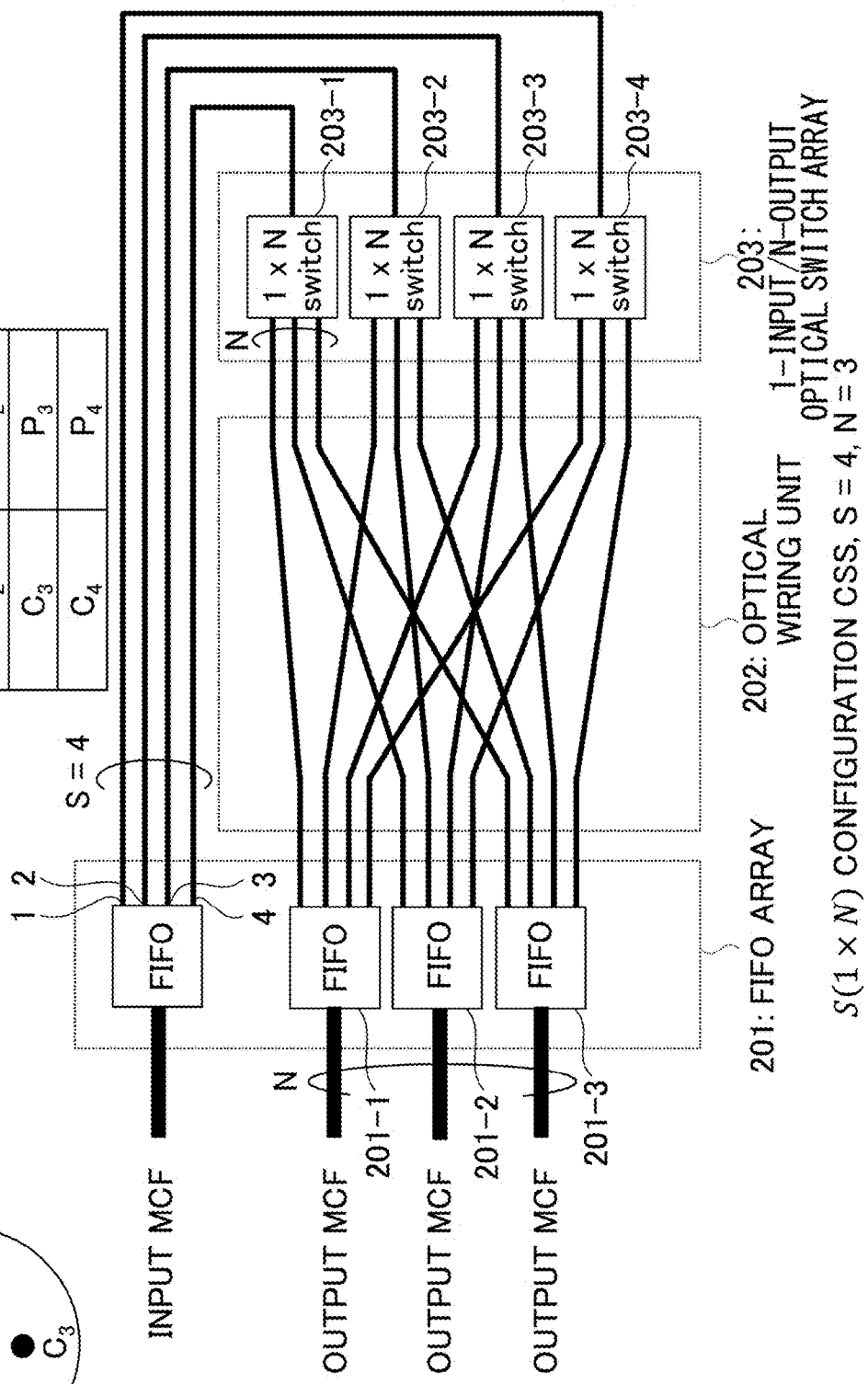
FIG. 13 is a diagram illustrating a core selective switch of Embodiment 9.

FIG. 13 illustrates an S(1×N) configuration CSS of Embodiment 9. The CSS of Embodiment 9 includes FIFOs 201-1 to 3 for connecting the MCF having S core(s) to S single core fiber(s) as the spatial demultiplexing unit and includes a 1×N optical switch array 203 including S 1-input N-output optical switch(es). An optical interconnect unit 202 is also included. The optical interconnect unit 202 may be a waveguide or an optical fiber.

Of the FIFOs constituting the FIFO array 201, one is used as an input side FIFO and the rest is used as an output side FIFO.

The example illustrated in FIG. 13 is a 4(1×3) configuration CSS with S=4, N=3. The input FIFO and four 1×3 optical switches are connected by four single core waveguides. Note that the optical fiber may be used instead of the single core waveguide.

Each of the three output ports of each 1×3 optical switch is connected to the input port corresponding to the 1×3 optical switch among the four input ports of the corresponding output side FIFO by the single core waveguide of the optical interconnect unit 202.

In the input side FIFO, the optical signal outputted to the output waveguide corresponding to each core of the MCF is switched to couple to the corresponding core of the MCF connected to the desired output FIFO by the 1×3 optical switch corresponding to the core.

As illustrated, assuming that the ports on the single core side of the FIFO are numbered 1, 2, 3, and 4 from the top, for example, the light outputted from the second port of the input side FIFO is inputted to the 1×3 optical switch 203-2. Assuming that the desired route is the output side FIFO 201-3, the light inputted to the 1×3 optical switch 203-2 is outputted from the lowest output port of the three output ports of the 1×3 optical switch 203-2 and is inputted to the second port of the output side FIFO 201-3, and is coupled to the corresponding core in the output MCF.

Embodiment 10

FIG. 14 illustrates a CSS of Embodiment 10. The CSS of Embodiment 10 includes, in addition to the CSS of Embodiment 9, a variable optical attenuator (VOA) array 204, which is an output power adjustment mechanism, between the input side FIFO and the 1×N optical switch array 203 (immediately before the 1×N optical switch array 203). Each variable optical attenuator constituting the variable optical attenuator array 204 is provided immediately before each optical switch.

The intensity of the light outputted from the input side FIFO is adjusted (attenuated) by the variable optical attenuator. This allows adjustment of the intensities of multiple light beams coupled to the output MCF. A monitoring mechanism for measuring the intensity of the light may be provided.

Embodiment 11

FIG. 15 illustrates a CSS of Embodiment 11. The CSS of Embodiment 11 includes, in addition to the CSS of Embodiment 9, an S×S (S is the number of core(s) of the MCF, and is four in this case) optical switch 206 is provided between the 1×N optical switch array 203 and the input side FIFO (immediately before the 1×N optical switch array 203). Further, the CSS of Embodiment 11 includes a variable optical attenuator array 205, which is an output power adjustment mechanism, immediately after the 1×N optical switch array 203. The intensity of the light outputted from the 1×N optical switch array 203 is adjusted (attenuated) by the variable optical attenuator. This allows adjustment of the intensities of multiple light beams coupled to the output MCF. A monitoring mechanism for measuring the intensity of the light may be provided.

Further, by providing the 4×4 optical switch 206, the light is outputted from the input side FIFO so that the light inputted to the 4×4 optical switch 206 via the single core waveguide can be inputted to the desired optical switch (any of 203-1 to 203-4 in FIG. 15). This allows the light outputted from the input side FIFO to be inputted to the desired core in the desired output MCF.

Embodiment 12

Embodiment 12 is an optical node device having the configuration illustrated in FIG. 3. However, any of the S(1×N) configuration CSS(s) described in Embodiments 1 to 11 is used as the CSS used in the input unit 1 and the output unit 2. As described previously, the optical node device illustrated in FIG. 3 includes the input unit 1, the output unit 2, the insertion unit 3, and the branch unit 4, and each unit is connected by the MCF as illustrated.

Each S(1×N) configuration CSS constituting the input unit 1 includes one input port connected to the MCF having S core(s) and N output port(s) each of them connected to the MCF having S core(s). And an optical signal propagated from a certain core of the input port (core number a) can be outputted to the core having the same core number a of any output MCF ports. Specific configuration examples of the CSS are as described in Embodiments 1 to 11. The CSS being used in the output unit 2 may be the same as the CSS being used in the input unit 1.

Each of the number of S(1×N) configuration CSSs equal to the number of input/output routes D (D=3 in FIG. 3) of the optical node device are arranged in the input side (the input unit 1) and the output side (the output unit 2) so that the optical node device of the Embodiment 12 can transmit an optical signal propagated from the core of a certain input route (input MCF) to the core having the same core number of any output route (output MCF). Further, the optical signal being inserted by the optical node device can be transmitted to the desired core of the desired output route (output MCF), and the optical signal propagated from the desired core of the desired input route (input MCF) of the optical node device can be branched and received.

In the S(1×N) configuration CSS described in Embodiments 1 to 11, the traveling direction of the optical signal in the input MCF (or the input single core fiber bundle, the input MCF bundle) is opposite to the traveling direction of the optical signal in the output MCF (or the output single core fiber bundle, the output MCF bundle). Therefore, the core numbers including the traveling direction are reversed left and right between the input fiber and the output fiber. If the S(1×N) configuration CSS is arranged in the input side and the output side as in the optical node device of Embodiment 12, the left and right inversion is eliminated because the optical signal passing through the optical node device (an optical signal routed from a certain input MCF to a certain output MCF) passes through the S(1×N) configuration CSS twice. On the other hand, the FIFO illustrated in FIG. 3(b) is used for the insertion unit 3 and the branch unit 4 on the client side in the optical node device. Since each of the optical signals being inserted via the FIFO and the optical signal being branched passes through the S(1×N) configuration CSS only once, the input port of the FIFO is required to be selected considering the left and right inversion of the core number in the S(1×N) configuration CSS.

Embodiment 13

As described previously, the FIFO illustrated in FIG. 3(b) is used for the insertion unit 3 and the branch unit 4 on the client side in the optical node device of the Embodiment 12 (FIG. 3). For example, if the light is to be emitted to the desired core of the MCF in the desired route in the output unit 2, the transmitter is required to be connected to the input port corresponding to the desired core in the FIFO to be connected to the CSS connected to the MCF of the desired route. If the route or the core that outputs the light is desired to be changed, the transmitter is required to change the connection, which takes time and effort.

Figure 16:
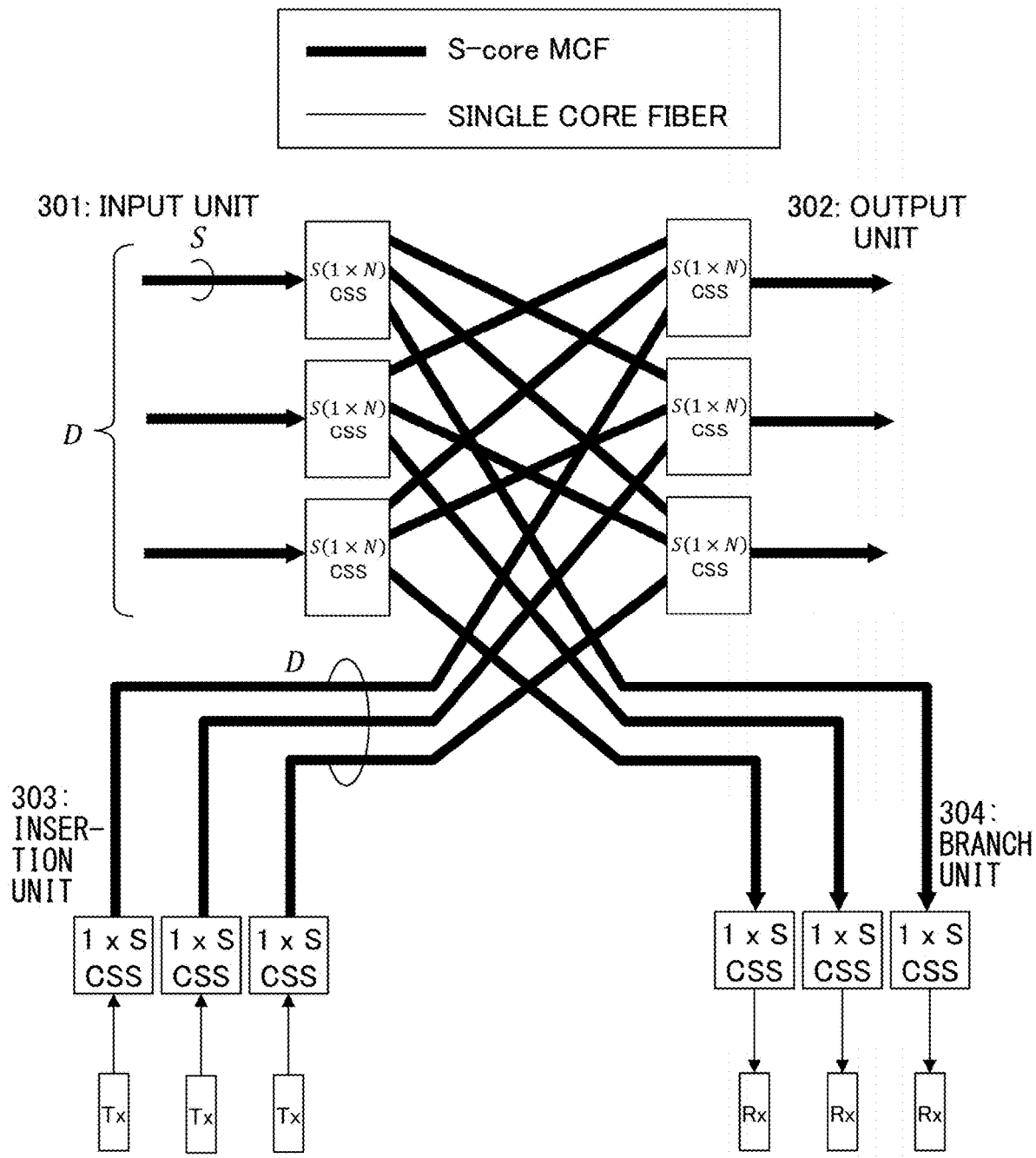
FIG. 16 is a diagram illustrating an optical node device of Embodiment 13.

FIG. 16 illustrates an optical node device of the Embodiment 13. The input unit 301 and the output unit 302 of the optical node device of Embodiment 13 are the same as the input unit 1 and the output unit 2 of the optical node device of Embodiment 12. In the optical node device of Embodiment 13, unlike the optical node device of Embodiment 12, a one-input S-output CSS is used in an insertion unit 303 and a branch unit 304. Hereinafter, the CSS of the present configuration will be referred to as a 1×S configuration CSS. By arranging the 1×S configuration CSS on the insertion unit 303 side, it is not necessary to change the connection of the transmitter even in the case of changing the core in the same route. The same applies to the branch unit 304 side. That is, each of the transmitter and the receiver can access any core of the MCF on the same route without changing the connection.

Figure 17:
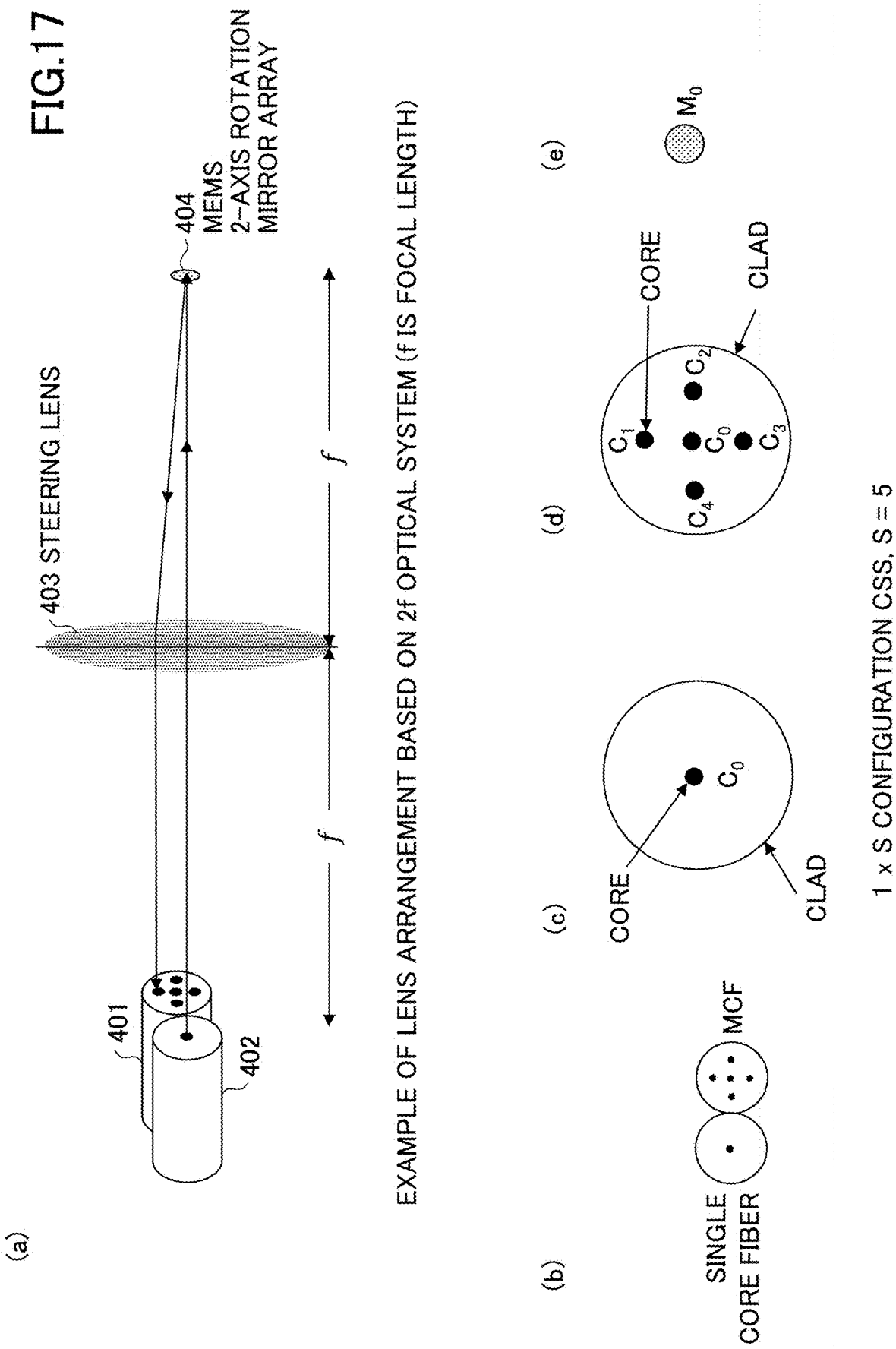
FIG. 17 is a diagram illustrating a core selective switch of Embodiment 13.

FIG. 17 illustrates a configuration example of the 1×S configuration CSS of Embodiment 13. FIG. 17 illustrates an example in the case of S=5. The CSS on the branch insertion side has basically the same configuration as the CSS on the transmission side, and includes a spatial demultiplexing unit, an optical switch, and an optical interconnect unit.

As illustrated in FIG. 17(a) (overall configuration) and FIG. 17(b) (arrangement of MCF and single core fiber), in the 1×S configuration CSS of Embodiment 13, a fiber array in which an input single core fiber 402 and an output MCF 401 are arranged side by side is provided as the spatial demultiplexing unit. As illustrated in FIG. 17(c) (arrangement in single core fiber) and FIG. 17(d) (core arrangement in MCF), one core $C_0$ is provided in the single core fiber and five cores ($C_0$, $C_1$, $C_2$, $C_3$, $C_4$) are provided in the MCF.

Further, as the optical switch, a MEMS 2-axis rotation mirror 404 (a variable reflection angle mirror) (e) is provided. Further, as the optical interconnect unit, a steering lens 403 arranged between the fiber array and the variable reflection angle mirror is provided. The focal length of the steering lens 403 is f, and the CSS of Embodiment 13 constitutes a 2f optical system.

In the 1×S configuration CSS of Embodiment 13, the light beam output from the input single core fiber 402 having a single core is focused on the MEMS 2-axis rotating mirror 404 and then reflected to couple to the desired core of the output MCF 401. FIG. 17(a) illustrates a trajectory of the light beam by a solid line when the input single core fiber 402 and the core $C_1$ of the output MCF 401 are connected. If the 1×S configuration CSS, as described with reference to FIG. 17, is adopted for the insertion unit and the branch unit of the optical node device of the Embodiment 13, the left and right inversion is eliminated because the inserted optical signal and the branched optical signal suffer the left and right inversion of the core number only an even number of times (twice).

In the example illustrated in FIG. 17, the MEMS is used as the optical switch, but this is an example, and the LCOS spatial modulator may be used as the optical switch. When using the LCOS spatial modulator, for example, the polarization diversity optical element is provided between the fiber array and the steering lens 403. Further, the variable optical attenuator may be arranged in front of the MEMS 2-axis rotary mirror 404.

Embodiment 14

Figure 18:
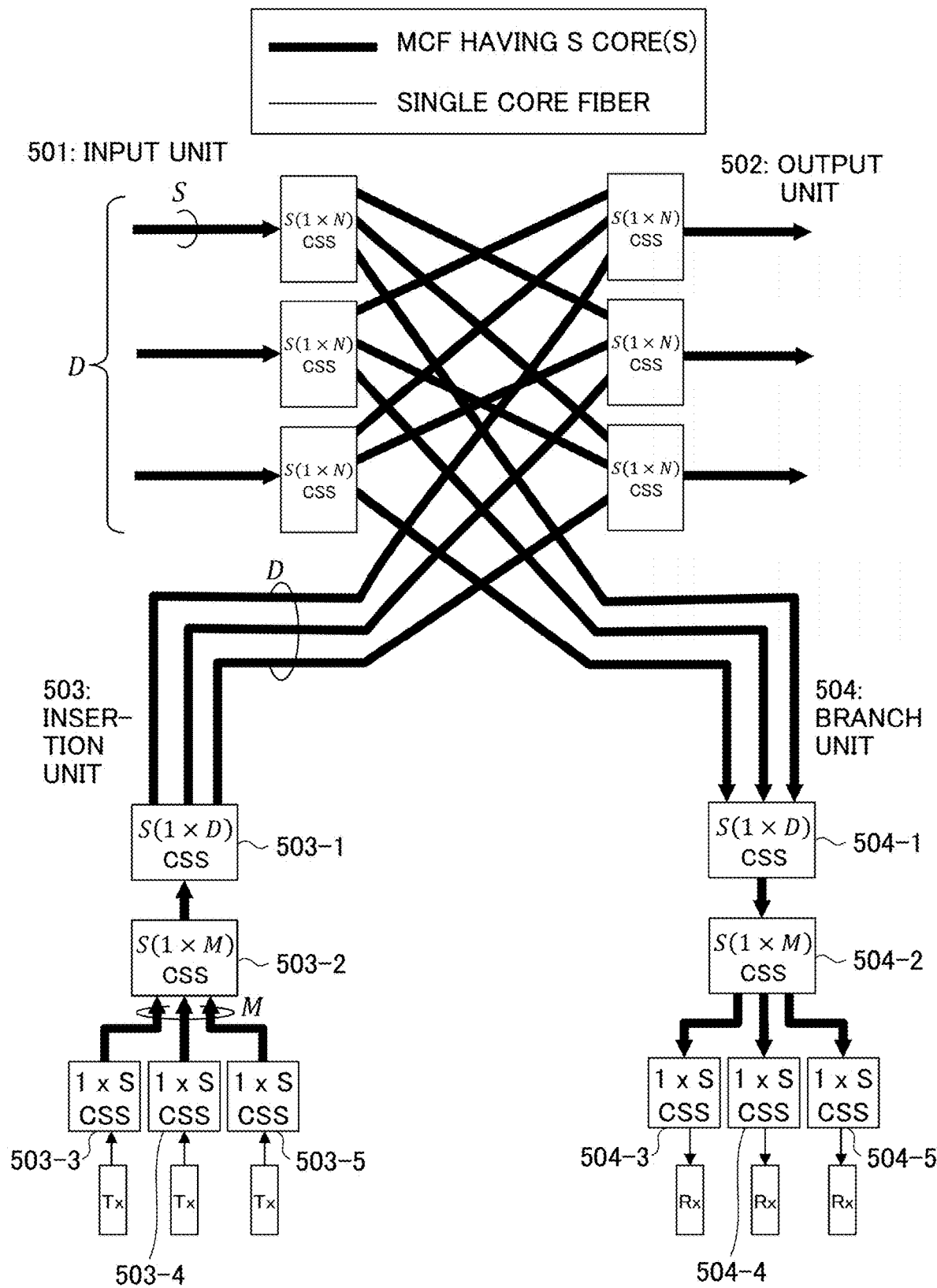
FIG. 18 is a diagram illustrating a core selective switch of Embodiment 14.

FIG. 18 illustrates an optical node device of Embodiment 14. An input unit 501 and an output unit 502 of the optical node device of Embodiment 14 are the same as the input unit 1 and the output unit 2 of the optical node device of the Embodiment 12.

In the optical node device of Embodiment 14, the S(1×N) configuration CSS and the 1×S configuration CSS are used in an insertion unit 503 and a branch unit 504. The S(1×N) CSS is the same as the CSS described in Embodiments 1 to 11. The 1×S configuration CSS is the CSS described in Embodiment 13.

As illustrated in FIG. 18, the insertion unit 503 includes an S(1×D) configuration CSS 503-1, an S(1×M) configuration CSS 503-2, and a 1×S configuration CSSs 503-3 to 503-5. Each output MCF of the 1×S configuration CSSs 503-3 to 503-5 is connected to one input MCF of M input MCF(s) (three in the present example in figure) of S(1×M) configuration CSS 503-2. One output MCF of the S(1×M) configuration CSS 503-2 is connected to one input MCF of the S(1×D) configuration CSS 503-1. The same applies to the configuration of the branch unit 504.

For example, the light outputted from the transmitter connected to the 1×S configuration CSS 503-3 is inputted to the desired core of the output MCF of the 1×S configuration CSS 503-3. Then the light is inputted to the core of the corresponding input MCF of the S(1×M) configuration CSS 503-2, and then is inputted from the S(1×M) configuration CSS 503-2 to the S(1×D) configuration CSS 503-1 to be outputted from the desired output MCF.

According to Embodiment 14, each of the transmitter and the receiver can access any output MCF/input MCF and any core without changing the connection. However, there is a limitation in that core competition occurs. Since the inserted optical signal and the branched optical signal suffer the left and right inversion of the core number only an even number of times (four times), the left and right inversion is eliminated.

Embodiment 15

Figure 19:
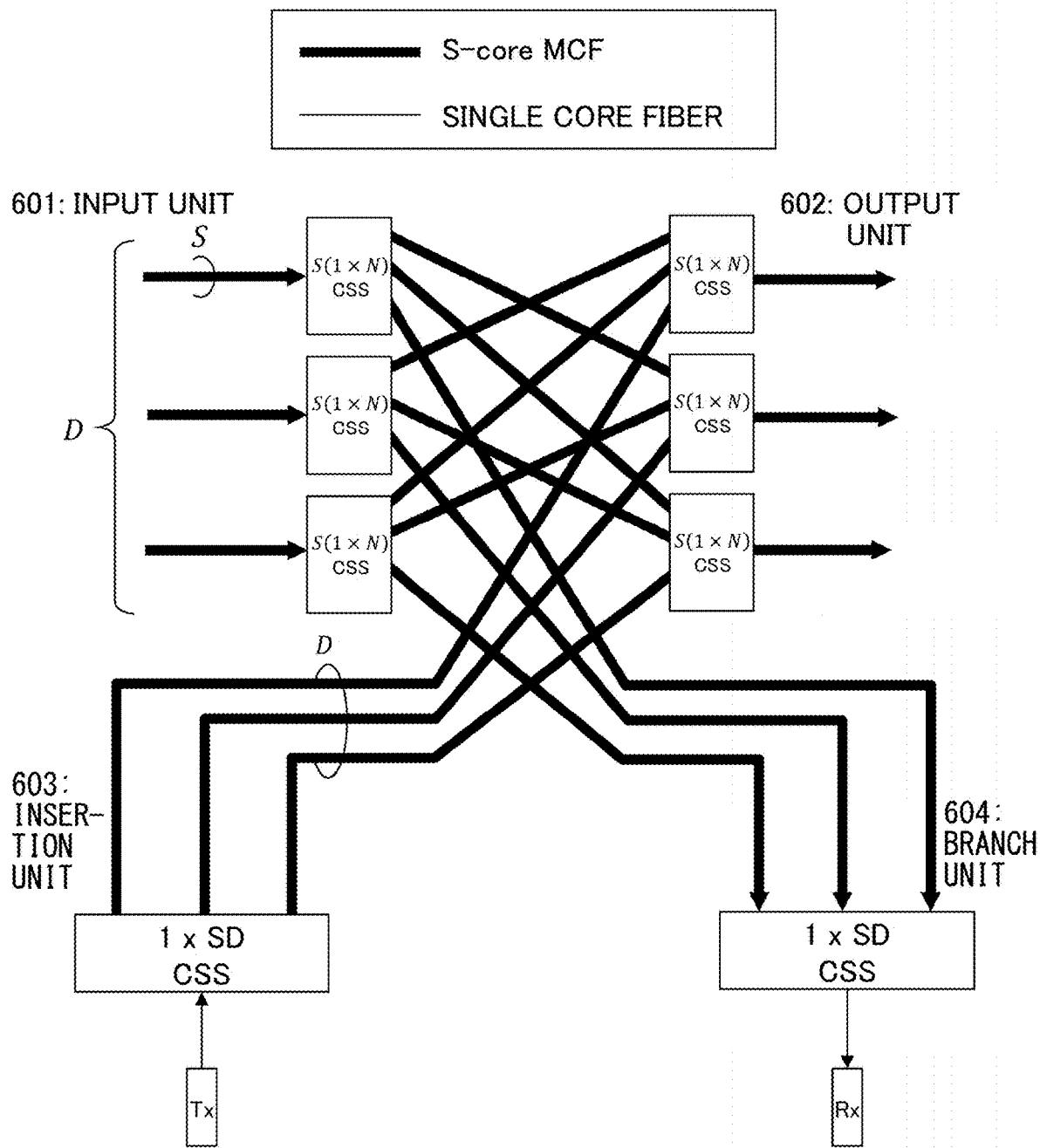
FIG. 19 is a diagram illustrating an optical node device of Embodiment 15.

FIG. 19 illustrates an optical node device of Embodiment 15. An input unit 601 and an output unit 602 of the optical node device of Embodiment 15 are the same as the input unit 1 and the output unit 2 of the optical node device of Embodiment 12.

In the optical node device of Embodiment 15, a one-input SD-output CSS is used in an insertion unit 603 and a branch unit 604. Hereinafter, the CSS of the present configuration will be referred to as 1×SD configuration CSS. The light emitted from the transmitter connected to the 1×SD configuration CSS of the insertion unit 603 can be outputted to the desired core of the MCF in the desired route.

That is, according to Embodiment 15, each of the transmitter and the receiver can access any output MCF/input MCF and any core without changing the connection. However, the efficiency of using the CSS port is low in the insertion unit 603 and the branch unit 604.

FIG. 20 illustrates a configuration example of the 1×SD configuration CSS of Embodiment 15. FIG. 20 illustrates an example of a configuration having D output S-core MCF(s) in the case of S=5 and D=6.

As illustrated in FIG. 20(a) (overall configuration) and FIG. 17(b) (arrangement of MCF and single core fiber), in the 1×SD configuration CSS of Embodiment 15, a fiber array 701 in which one input single core fiber and six output MCFs are arranged in a plane (the end sides are in a plane perpendicular to the optical axis) as the spatial demultiplexing unit. That is, in the present example, as illustrated in FIG. 20(b), the input single core fiber is arranged in the center, and six output MCFs are arranged around the input single core fiber so as to form a hexagon. The fiber array 701 may have a configuration in which one input SMF and six output MCFs are arranged in a straight line.

As illustrated in FIG. 20(c) (single core fiber core arrangement) and (d) (core arrangement in MCF), one core $C_0$ is provided in the single core fiber and five cores ($C_0$, $C_1$, $C_2$, $C_3$, $C_4$) are provided in the MCF. As the optical switch, a MEMS 2-axis rotation mirror 703 (a variable reflection angle mirror) is provided.

Further, as the optical interconnect unit, a steering lens 702 arranged between the fiber array 701 and the reflection angle variable mirror is provided. The focal length of the steering lens 702 is f, and the CSS of Embodiment 15 constitutes a 2f optical system.

In the CSS of Embodiment 15, the light beam output from the input single core fiber having a single core is focused on the MEMS 2-axis rotation mirror 703 and then reflected to couple to the desired core of the desired output MCF. FIG. 20(a) illustrates a trajectory of the light beam by a solid line when the input single core fiber and the core $C_1$ of the output $MCF_2$ are connected.

In the example illustrated in FIG. 20, the position of the single core fiber in the fiber array 701 is set to the center, but this is an example and may be located at a position other than the center. Further, although MEMS is used as the optical switch, this is an example, and the LCOS spatial modulator may be used as the optical switch. When using the LCOS spatial modulator, for example, the polarization diversity optical element is provided between the fiber array 701 and the steering lens 702. Further, for example, the variable optical attenuator may be arranged in front of the MEMS 2-axis rotary mirror 703. If the 1×SD configuration CSS as described with reference to FIG. 20 is adopted for the insertion unit and the branch unit of the optical node device of the Embodiment 15, the left and right inversion is eliminated because the inserted optical signal and the branched optical signal suffer the left and right inversion of the core number only an even number of times (twice).

Embodiment 16

Figure 21:
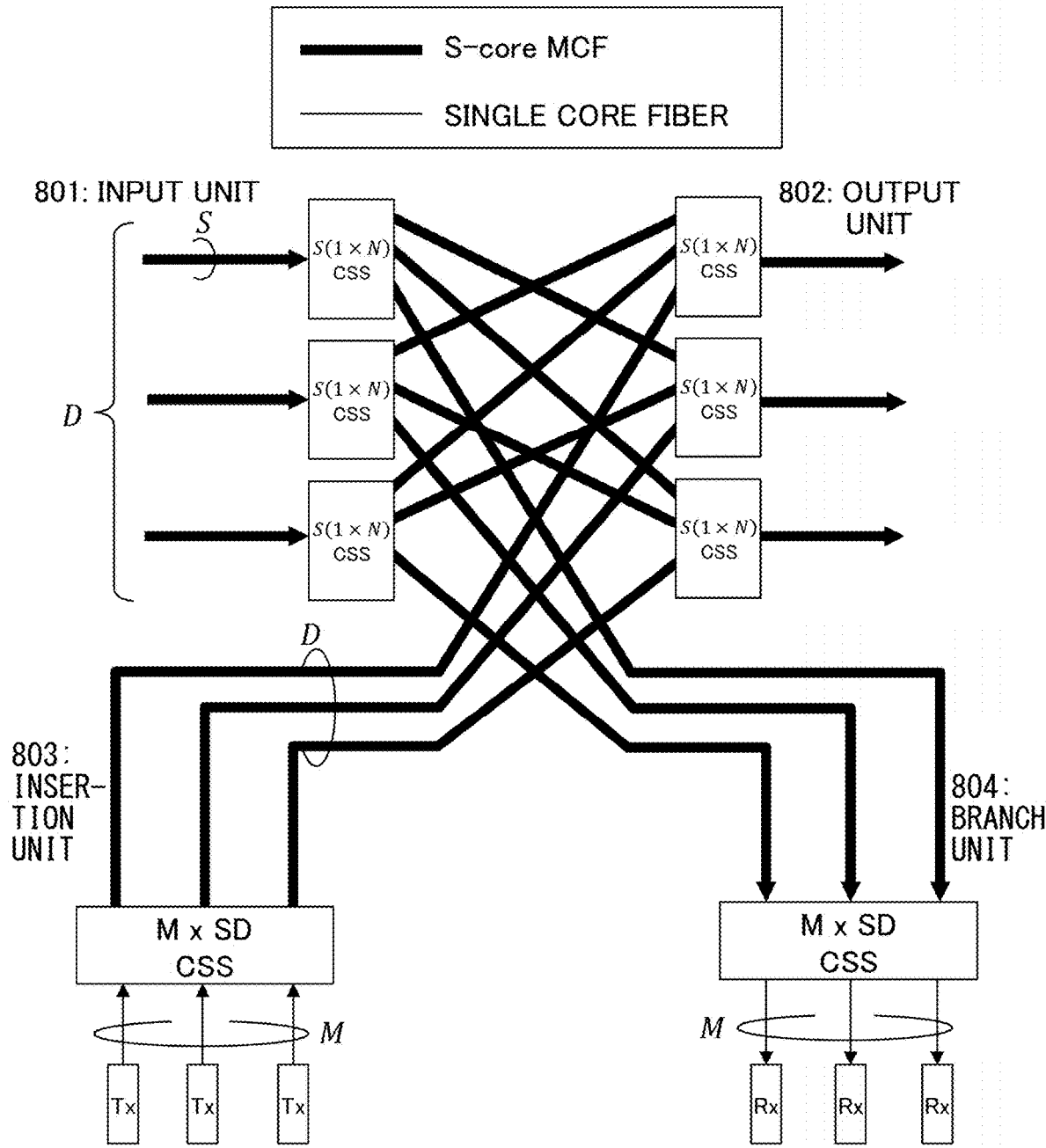
FIG. 21 is a diagram illustrating an optical node device of Embodiment 16.

FIG. 21 illustrates an optical node device of Embodiment 16. An input unit 801 and an output unit 802 of the optical node device of the Embodiment 16 are the same as the input unit 1 and the output unit 2 of the optical node device of Embodiment 12.

In the optical node device of Embodiment 16, an M-input SD-output CSS is used in the insertion unit 803 and the branch unit 804. Hereinafter, the CSS of the present configuration will be referred to as M×SD configuration CSS. The light emitted from the transmitter connected to the M×SD configuration CSS of the insertion unit 803 can be outputted to the desired core of the MCF in the desired route.

That is, according to Embodiment 16, each of the transmitter and the receiver can access any output MCF/input MCF and any core without changing the connection. There is no core competition and the efficiency of using the CSS port in the input/output unit is more efficient. However, the configuration of the M×SD configuration CSS is complicated.

Figure 22:
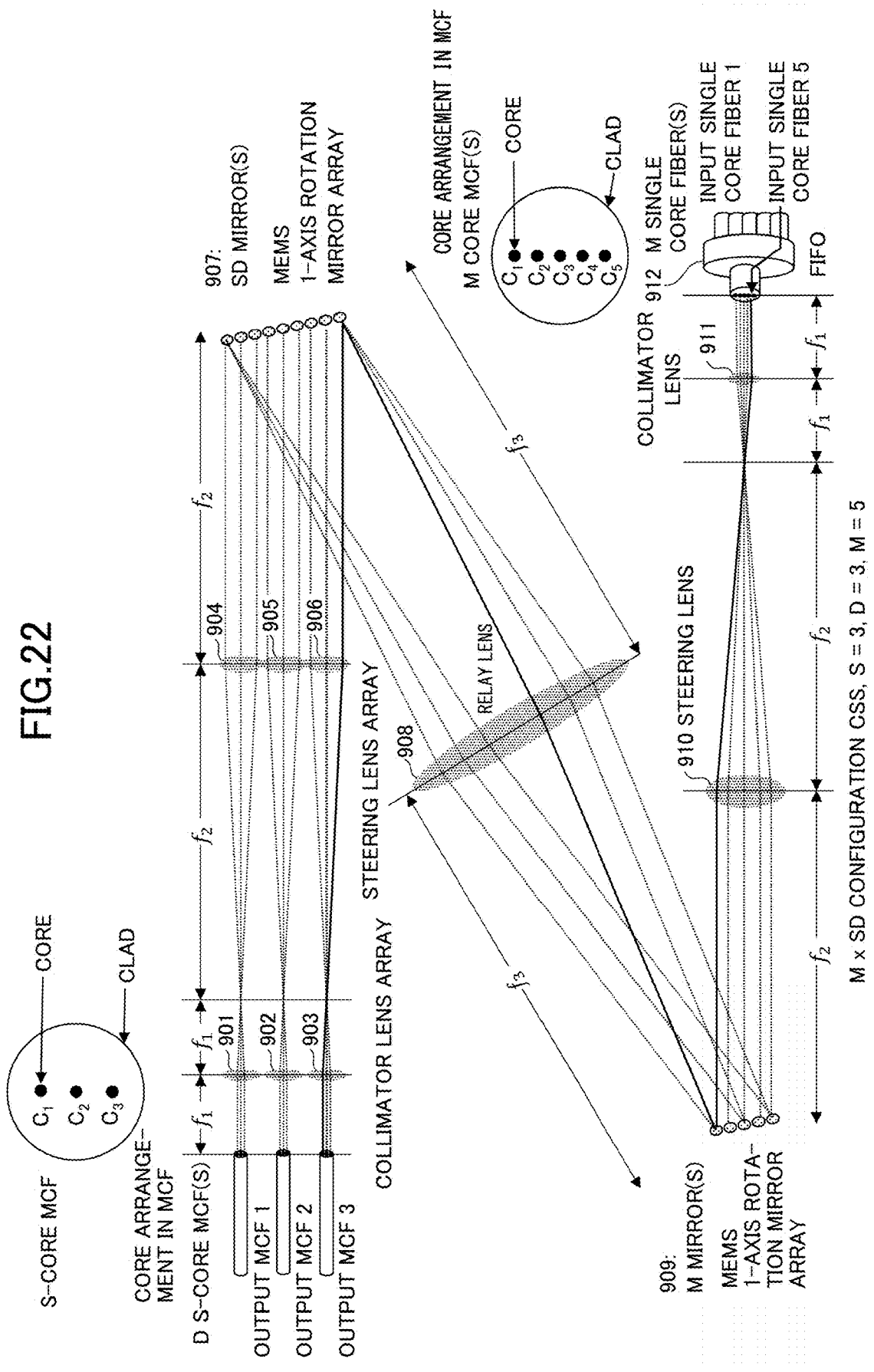
FIG. 22 is a diagram illustrating a core selective switch of Embodiment 16.

FIG. 22 illustrates a configuration example of the M×SD configuration CSS of Embodiment 16. Next to Embodiment 16, variations of the M×SD configuration CSS will be described as Embodiment 17 and Embodiment 18. In this regard, first, the configuration common to Embodiment 16 and Embodiment 17 will be described.

The M×SD configuration CSS includes the spatial demultiplexing unit, the optical switch, and the optical interconnect unit, similarly to the CSS described so far.

The spatial demultiplexing unit includes N input MCF collimator(s) comprising an MCF having M core(s) to which M input single core fiber(s) are connected and a collimator lens, D output MCF collimator(s) comprising an MCF having S core(s) and a collimator lens, and an output MCF collimator array arranged in a straight line or a plane. The optical switch is a mirror array comprising MN variable reflection angle mirror(s) and a mirror array comprising SD variable reflection angle mirror(s). The optical interconnect unit includes a steering lens arranged between the input MCF collimator and the mirror array comprising MN variable reflection angle mirror(s), a steering lens arranged between the output MCF collimator array and the mirror array comprising SD variable reflection angle mirror(s), and a relay lens arranged between the two mirror arrays.

In the present configuration, the light beam output from any input single core fiber is reflected by the variable reflection angle mirror so as to couple to the desired core of the desired output MCF.

Subsequently, the M×SD configuration CSS illustrated in FIG. 22 will be described. FIG. 22 illustrates an example in the case of M=5, N=1, S=3, and D=3. Further, an example of lens arrangement based on the 4f optical system (f is the focal length) is illustrated.

The M×SD configuration CSS illustrated in FIG. 22 includes, as the spatial demultiplexing unit, an N (one) input MCF collimator(s) comprising a FIFO 912 and a collimator lens 911 with focal length $f_1$, and an output MCF collimator array comprising an output MCF having three cores and collimator lenses 901 to 903 (a collimator lens array). The FIFO 912 has a configuration in which five SMFs are connected to the input side, bundled, and converted into a five-core MCF on the output side.

In the example of FIG. 22, the outputs MCF1 to MCF3 and the collimator lenses 901 to 903 are arranged in a straight line in the vertical direction. However, this is an example, and may be arranged in a plane as in the example illustrated in FIG. 20.

The M×SD configuration CSS illustrated in FIG. 22 includes, as the optical switch, a MEMS 1-axis rotation mirror array 909 comprising five mirrors and a MEMS 1-axis rotation mirror array 907 comprising nine mirrors.

Further, the M×SD configuration CSS illustrated in FIG. 22 includes, as the optical interconnect unit, a steering lens 910 (focal length $f_2$) arranged between the collimator lens 911 and the MEMS 1-axis rotation mirror array 909, a steering lens array (steering lens 904 to 906, focal length $f_2$) arranged between the collimator lens array (collimator lens 901 to 903) and the MEMS 1-axis rotation mirror array 907, and a relay lens 908 (focal length $f_3$) arranged between the MEMS 1-axis rotation mirror array 909 and the MEMS 1-axis rotation mirror array 907.

In the example of FIG. 22, each mirror in the MEMS 1-axis rotation mirror array 909 corresponds to any one input single core fiber. Specifically, each mirror in the MEMS 1-axis rotation mirror array 909 corresponds to, in order from the top, the input single core fiber 5, the input single core fiber 4, the input single core fiber 3, the input single core fiber 2, and the input single core fiber 1.

Further, in the example of FIG. 22, each mirror in the MEMS 1-axis rotation mirror array 907 corresponds to any one core of the output MCF. Specifically, of the mirrors in the MEMS 1-axis rotation mirror array 907, three mirrors from the top correspond to the output MCF1, the next three mirrors correspond to the output MCF2, and the last three mirrors correspond to the output MCF3. Further, the three mirrors corresponding to one output MCF correspond to, from the top, the core $C_3$, the core $C_2$, and the core $C_1$.

In the M×SD configuration CSS of FIG. 22, for example, the light beam output from the transmitter to the input SMFS is incident on the top mirror (the mirror corresponding to the input SMFS) in the MEMS 1-axis rotation mirror array 909.

The incident light beam is reflected by the mirror and is incident on the MEMS 1-axis rotation mirror array 907, which corresponds to the desired core in the desired output MCF. Herein, the core $C_1$ of the output MCF3 is the desired core, and the light beam is incident on the corresponding bottom mirror. The light beam reflected from the mirror is coupled to the core $C_1$ of the output MCF3.

In the example of FIG. 22, the MEMS is used as the optical switch, but this is an example, and the LCOS spatial modulator may be used as the optical switch. However, when the LCOS spatial modulator is used, the polarization diversity optical element is also used. Further, the variable optical attenuator may be arranged in the optical path to align the intensity of the light incident on the core of the output MCF. Further, each core in the MCF may be arranged two-dimensionally as illustrated in FIG. 6 and FIG. 7. In this case, the mirrors are two-dimensionally arranged in a manner similar to the core arrangement of the magnification $f_2/f_1$, and have the degree of freedom of 2-axis rotation (reflection angle degree of freedom). Further, the MCF itself may be arranged two-dimensionally. In that case, multiple mirrors corresponding to the core arrangement of the MCF are further arranged two-dimensionally.

Hereinafter, variations of the M×SD configuration CSS will be described with reference to Embodiment 17 and Embodiment 18.

Embodiment 17

Figure 23:
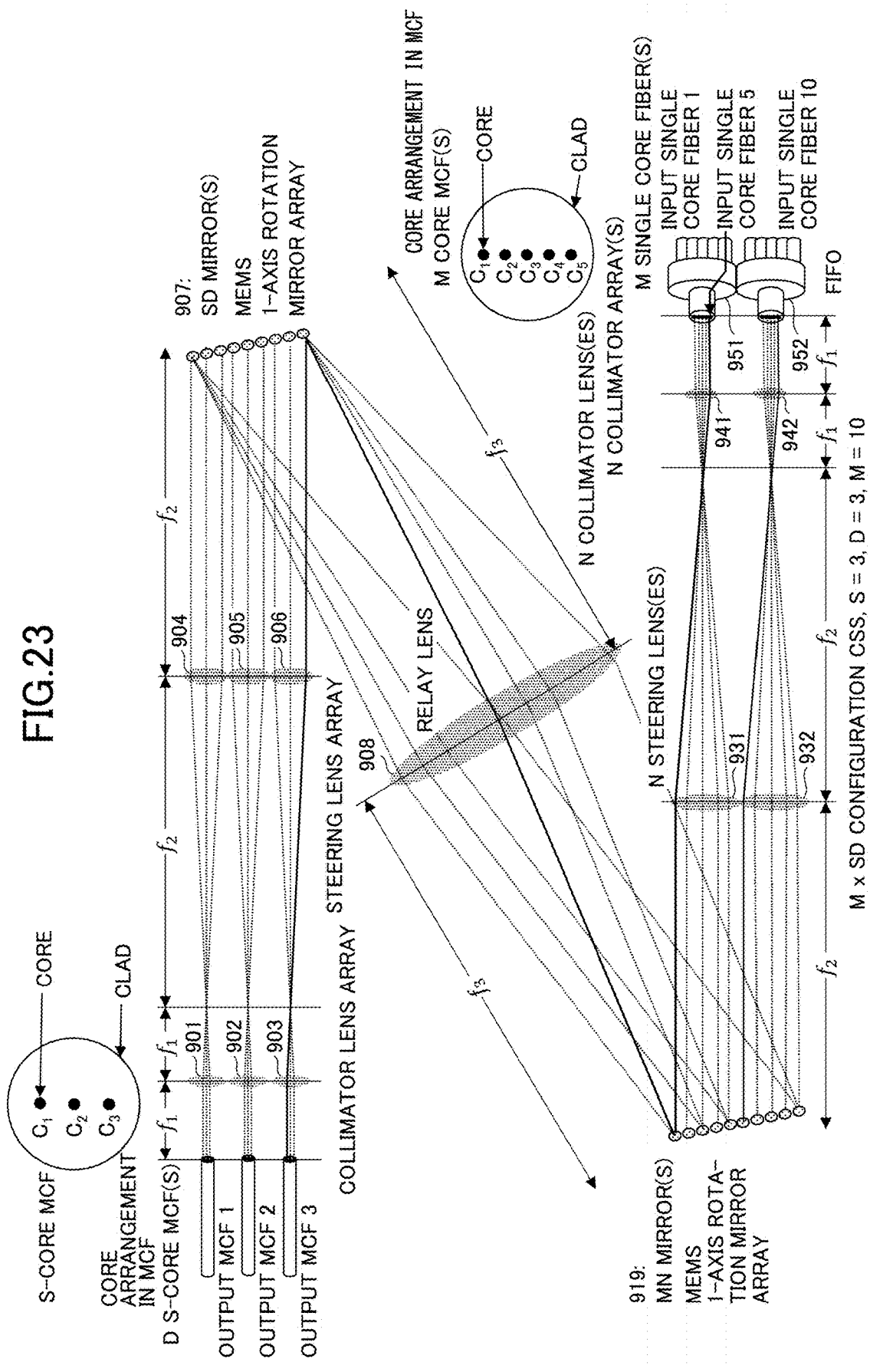
FIG. 23 is a diagram illustrating a core selective switch of Embodiment 17.

FIG. 23 illustrates the M×SD configuration CSS of Embodiment 17. FIG. 23 illustrates an example in the case of M=5, N=2, S=3, and D=3. Further, an example of lens arrangement based on the 4f optical system (f is the focal length) is illustrated.

The M×SD configuration CSS illustrated in FIG. 23 includes, as the spatial demultiplexing unit, an input MCF collimator array (comprising two input MCF collimators) configured by an input MCF collimator comprising the FIFO 951 and the collimator lens 941 with focal length f1 and an input MCF collimator comprising the FIFO 952 and the collimator lens 942 with focal length f1, and an output MCF collimator array comprising outputs MCF1 to MCF3 having three 3-core and collimator lenses 901 to 903 (collimator lens array). Both the FIFO 951 and the FIFO 952 have a configuration in which five SMFs are connected to the input side, bundled, and converted into a five-core MCF on the output side.

In the example of FIG. 23, the outputs MCF1 to MCF3 and the collimator lenses 901 to 903 are arranged in a straight line in the vertical direction. However, this is an example, and may be arranged in a plane as in the example illustrated in FIG. 20.

The M×SD configuration CSS illustrated in FIG. 23 includes, as the optical switch, a MEMS 1-axis rotation mirror array 919 comprising ten mirrors and a MEMS 1-axis rotation mirror array 907 comprising nine mirrors.

Further, the M×SD configuration CSS illustrated in FIG. 23 includes, as the optical interconnect unit, steering lenses 931, 932 (focal length $f_2$) arranged between the collimator lenses 941, 942 and the MEMS 1-axis rotation mirror array 919, a steering lens array (steering lenses 904 to 906, focal length $f_2$) arranged between the collimator lens array (collimator lenses 901 to 903) and the MEMS 1-axis rotation mirror array 907, and a relay lens 908 (focal length $f_3$) arranged between the MEMS 1-axis rotation mirror array 919 and the MEMS 1-axis rotation mirror array 907.

In the example of FIG. 23, the mirrors of the MEMS 1-axis rotation mirror array 919, five mirrors from the top, correspond to the FIFO 951 and the FIFO 952. Each mirror in the cluster of five mirrors corresponds to the input single core fiber in any one of the corresponding FIFOs. Specifically, for example, each of the upper five mirrors in the MEMS 1-axis rotation mirror array 919 corresponds to, in order from the top, the input single core fiber 5, the input single core fiber 4, the input single core fiber 3, and the input single core fiber 2, and the input single core fiber 1, of the FIFO 951.

Further, in the example of FIG. 23, each mirror in the MEMS 1-axis rotation mirror array 907 corresponds to any one core of any one output MCF. Specifically, the output MCF1, the output MCF2, and the output MCF3 correspond to three mirrors from the top of the MEMS 1-axis rotation mirror array 907. Further, the three mirrors corresponding to one output MCF correspond to the core $C_3$, the core $C_2$, and the core $C_1$ from the top.

In the M×SD configuration CSS of FIG. 23, for example, the light beam output from the transmitter to the input single core fiber 5 of the FIFO 951 is incident on the top mirror (the mirror corresponding to the input SMFS) in the MEMS 1-axis rotation mirror array 919. The incident light beam is reflected by the mirror and is incident on the MEMS 1-axis rotation mirror array 907, which corresponds to the desired core in the desired output MCF. Herein, the core $C_1$ of the output MCF3 is the desired core, and the light beam is incident on the corresponding bottom mirror. The light beam reflected from the mirror is coupled to the core $C_1$ of the output MCF3.

In the example of FIG. 23, the MEMS is used as the optical switch, but this is an example, and the LCOS spatial modulator may be used as the optical switch. However, when the LCOS spatial modulator is used, the polarization diversity optical element is also used. Further, the variable optical attenuator may be arranged in the optical path to align the intensity of the light incident on the core of the output MCF. Further, the core and the MCF may be arranged two-dimensionally. In this case, the mirrors are two-dimensionally arranged and have the degree of freedom of 2-axis rotation (reflection angle degree of freedom). That is, the SD mirrors illustrated in FIG. 23 are two-dimensionally arranged in the plane, and the MN mirrors are two-dimensionally arranged in the plane. Further, in this case, each mirror is a 2-axis rotation mirror.

Embodiment 18

Figure 24:
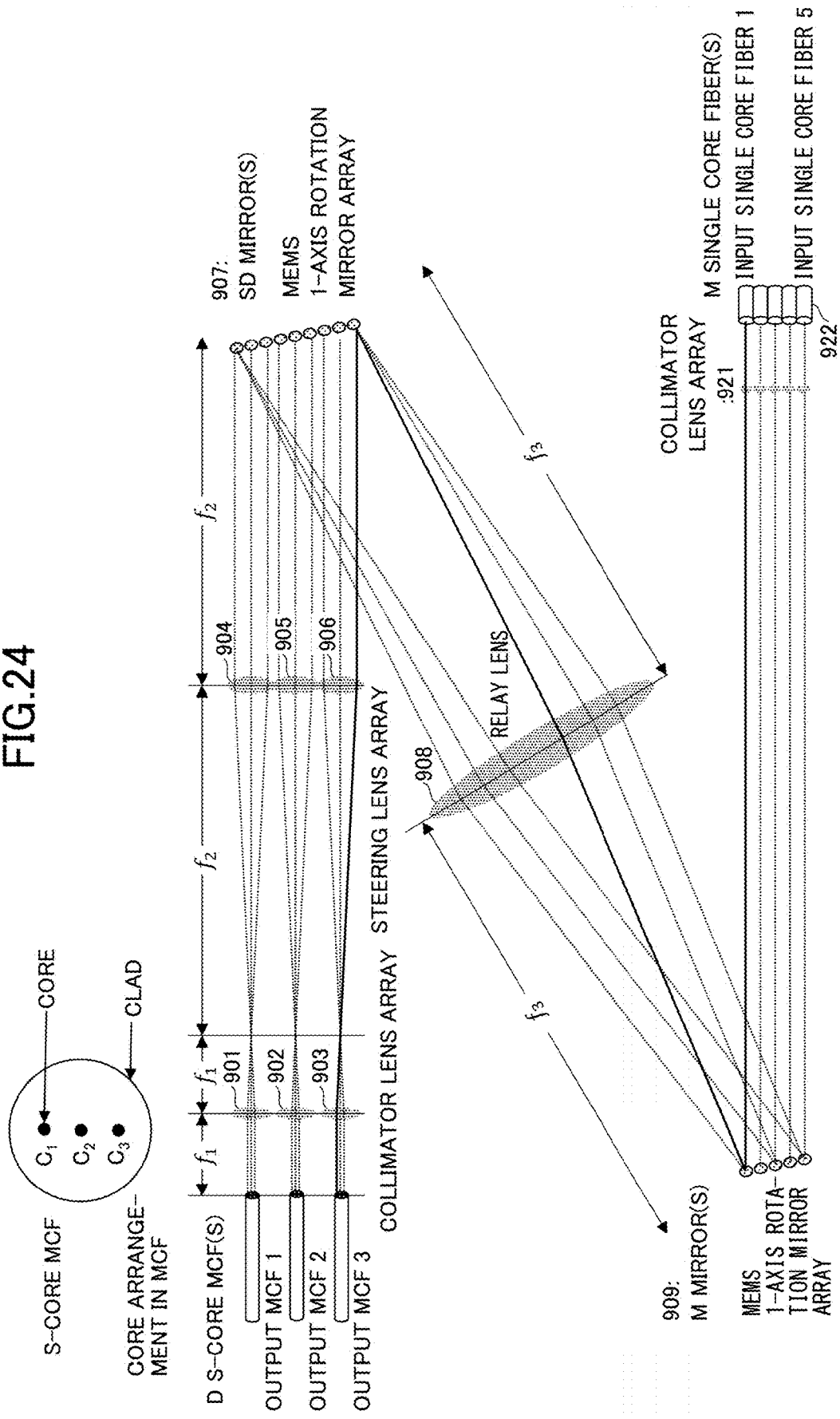
FIG. 24 is a diagram illustrating a core selective switch of Embodiment 18.

FIG. 24 illustrates the M×SD configuration CSS of Embodiment 18. FIG. 24 illustrates an example in the case of M=5, S=3, and D=3. Further, an example of lens arrangement based on the 4f optical system (f is the focal length) is illustrated.

The M×SD configuration CSS illustrated in FIG. 24 includes, as the spatial demultiplexing unit, an input MCF collimator comprising five SMFs (922) and collimator lens array 921, and an output MCF collimator array comprising output MCF1 to MCF3 having three 3-core and collimator lenses 901 to 903 (collimator lens array).

In the example of FIG. 24, the outputs MCF1 to MCF3 and the collimator lenses 901 to 903 are arranged in a straight line in the vertical direction. However, this is an example, and may be arranged in a plane as in the example illustrated in FIG. 20.

The M×SD configuration CSS illustrated in FIG. 24 includes, as the optical switch, a MEMS 1-axis rotation mirror array 909 comprising five mirrors and a MEMS 1-axis rotation mirror array 907 comprising nine mirrors.

Further, the M×SD configuration CSS illustrated in FIG. 24 includes, as the optical interconnect unit, a steering lens array (steering lenses 904 to 906, focal length $f_2$) arranged between the collimator lens array (collimator lenses 901 to 903) and the MEMS 1-axis rotation mirror array 907, and a relay lens 908 (focal length $f_3$) arranged between the MEMS 1-axis rotation mirror array 909 and the MEMS 1-axis rotation mirror array 907.

In the example of FIG. 24, the five mirrors of the MEMS 1-axis rotation mirror array 909, in order from the top, correspond to the input single core fiber 1, the input single core fiber 2, the input single core fiber 3, the input single core fiber 4, and the input single core fiber 5.

Further, in the example of FIG. 24, each mirror in the MEMS 1-axis rotation mirror array 907 corresponds to any one core of any one output MCF. Specifically, the output MCF1, the output MCF2, and the output MCF3 correspond to three mirrors from the top of the MEMS 1-axis rotation mirror array 907. Further, the three mirrors corresponding to one output MCF correspond to, from the top, the core $C_3$, the core $C_2$, and the core $C_1$.

In the M×SD configuration CSS of FIG. 24, for example, the light beam output from the transmitter to the input single core fiber 1 is incident on the top mirror (the mirror corresponding to the input SMF1) in the MEMS 1-axis rotation mirror array 909. The incident light beam is reflected by the mirror and is incident on the MEMS 1-axis rotation mirror array 907, which corresponds to the desired core in the desired output MCF. Herein, the core $C_1$ of the output MCF3 is the desired core, and the light beam is incident on the corresponding bottom mirror. The light beam reflected from the mirror is coupled to the core $C_1$ of the output MCF3.

In the example of FIG. 24, the MEMS is used as the optical switch, but this is an example, and the LCOS spatial modulator may be used as the optical switch. However, when the LCOS spatial modulator is used, the polarization diversity optical element is also used. Further, the variable optical attenuator may be arranged on the optical path to adjust the intensity of the light incident on the core of the output MCF. Further, the core and the MCF may be arranged two-dimensionally. In this case, the mirrors are two-dimensionally arranged and have the degree of freedom of 2-axis rotation (reflection angle degree of freedom).

Embodiment 19

FIG. 25 illustrates the CSS of Embodiment 19. The CSS is an example of the 1×S configuration CSS used in the insertion unit 303 and the branch unit 304 in the optical node device of the Embodiment 13 illustrated in FIG. 16.

The CSS of Embodiment 19 includes a FIFO 1001 for connecting an MCF having S core(s) to S single core fiber(s) as the spatial demultiplexing unit, and includes a 1×S optical switch 1003 as the optical switch. An optical interconnect unit 1002 is also included. The optical interconnect unit 1002 may be the waveguide or the optical fiber.

In the example illustrated in FIG. 25, S=4, and the FIFO and the 1×4 optical switch are connected by four single core waveguides. Note that the optical fiber may be used instead of the single core waveguide.

The light inputted to the input single core fiber is switched by the 1×4 optical switch to couple to the desired core in the output MCF.

Embodiment 20

Figure 26:
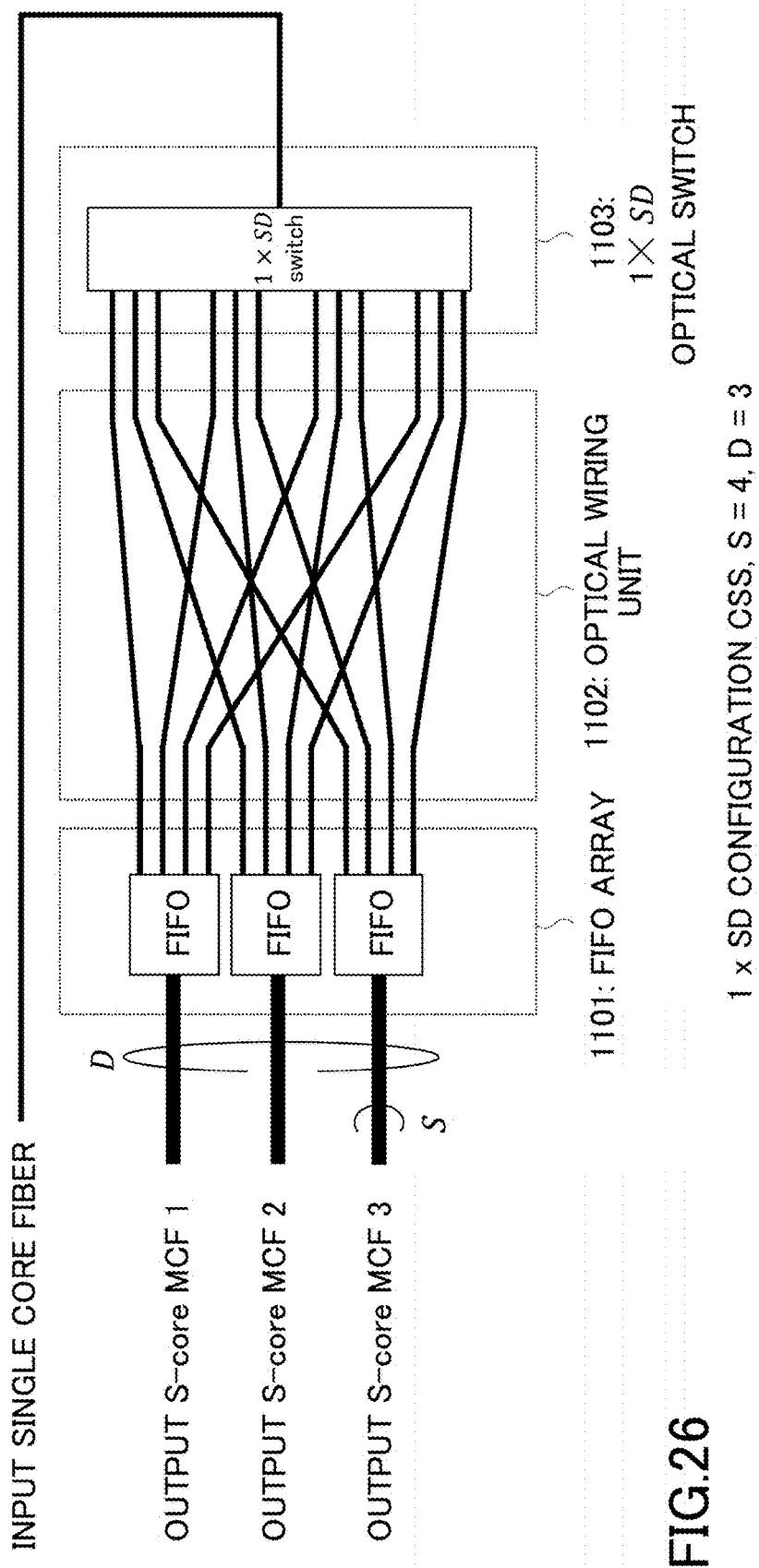
FIG. 26 is a diagram illustrating a core selective switch of Embodiment 20.

FIG. 26 illustrates the CSS of Embodiment 20. The CSS is an example of the 1×SD configuration CSS used in the insertion unit 603 and the branch unit 604 in the optical node device of the Embodiment 15 illustrated in FIG. 19, and is implemented by using the waveguide circuit.

The CSS of Embodiment 20 includes a FIFO array 1101 as the spatial demultiplexing unit and a 1×SD optical switch 1103 as the optical switch. An optical interconnect unit 1102 is also included. The optical interconnect unit 1102 may be the waveguide or the optical fiber.

In the example illustrated in FIG. 26, S=4 and D=3, and three FIFOs and the 1×SD optical switch 1103 are connected by twelve single core waveguides. Note that the optical fiber may be used instead of the single core waveguide.

The light inputted to the input single core fiber is switched by the 1×SD output optical switch 1103 to couple to the desired core in the desired output MCF.

Embodiment 21

Figure 27:
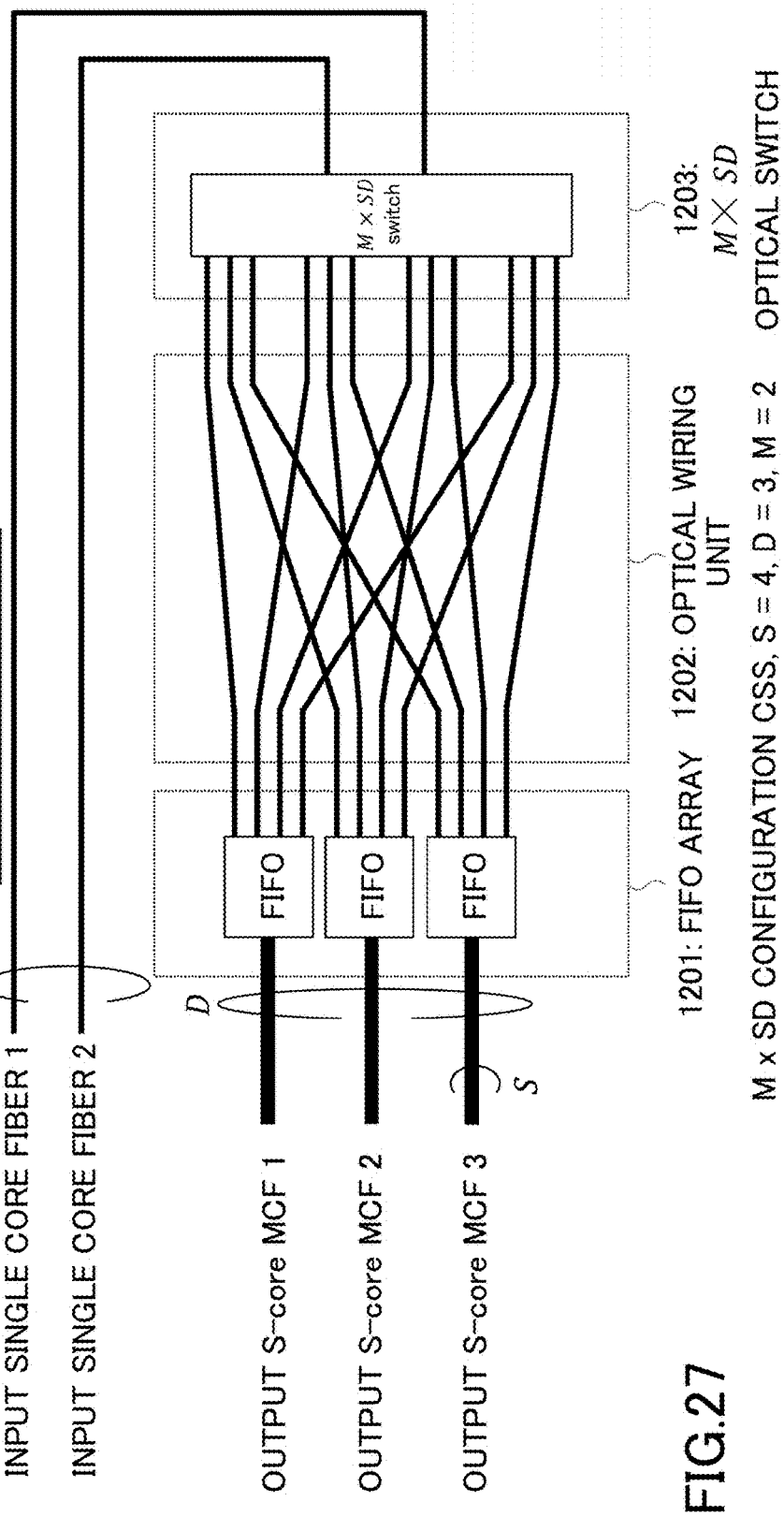
FIG. 27 is a diagram illustrating a core selective switch of Embodiment 21.

FIG. 27 illustrates the CSS of Embodiment 21. The CSS is the M×SD configuration CSS used in the insertion unit 803 and the branch unit 804 in the optical node device of the Embodiment 16 illustrated in FIG. 21.

The CSS of Embodiment 21 includes a FIFO array 1201 as the spatial demultiplexing unit and an M×SD optical switch 1203 as the optical switch. An optical interconnect unit 1202 is also included. The optical interconnect unit 1202 may be the waveguide or the optical fiber.

In the example illustrated in FIG. 27, S=4, D=3, and M=2, and the three FIFOs and the M×SD optical switch 1103 are connected by twelve single core waveguides. Note that the optical fiber may be used instead of the single core waveguide.

The light inputted to the input single core fiber is switched by the M×SD optical switch 1203 to couple to the desired core in the desired output MCF.

Embodiment 22

Figure 28:
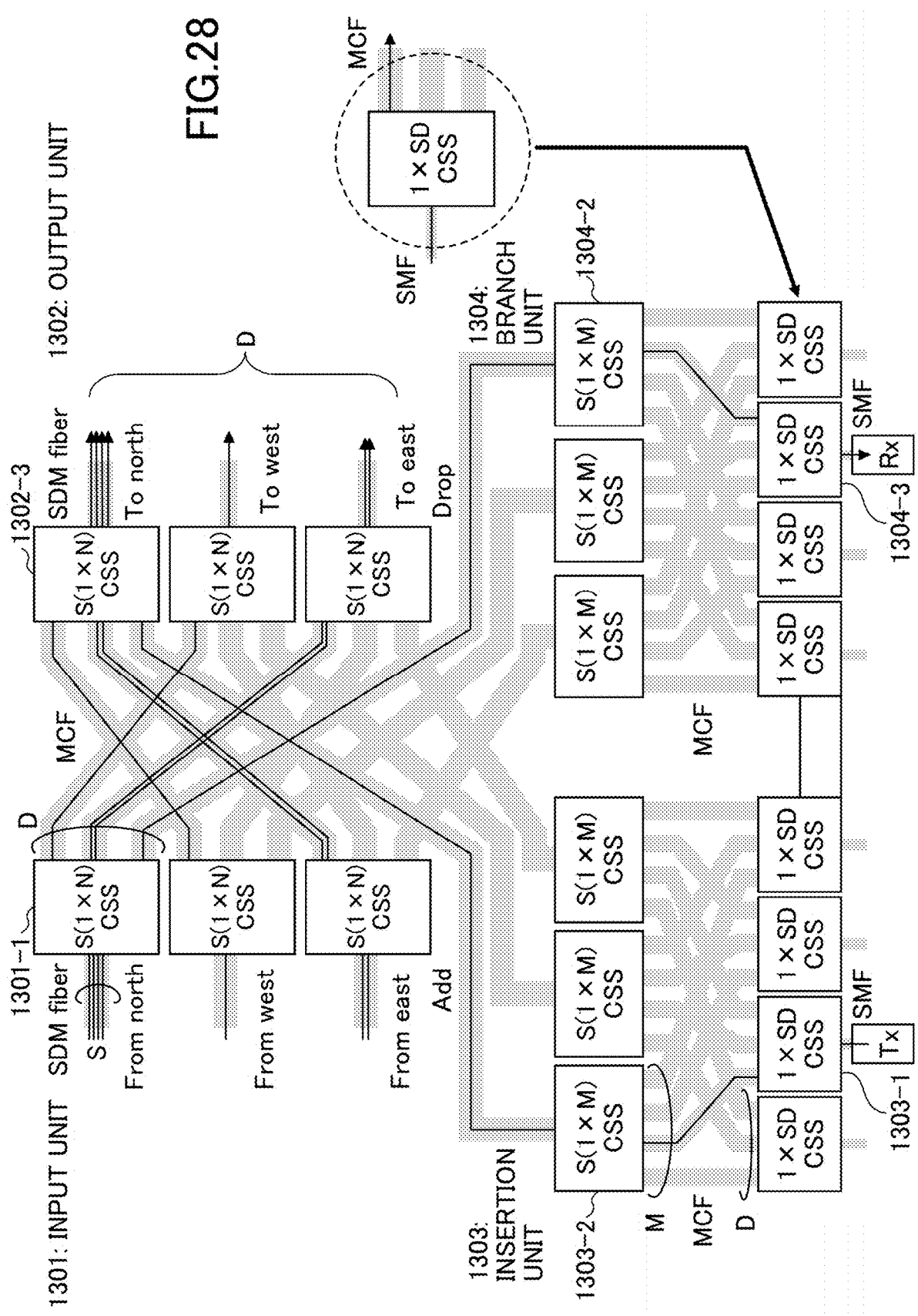
FIG. 28 is a diagram illustrating an optical node device of Embodiment 22.

FIG. 28 illustrates the optical node device of Embodiment 22. FIG. 28 illustrates an example in the case of N=D=3, M=4, and S=4. As illustrated in FIG. 28, the optical node device of Embodiment 22 includes an input unit 1301, an output unit 1302, an insertion unit 1303, and a branch unit 1304. The input unit 1301 and the output unit 1302 of the optical node device of Embodiment 22 are the same as the input unit 1 and the output unit 2 of the optical node device of Embodiment 12. Any of the S(1×N) configuration CSSs described in Embodiments 1 to 11 may be used as the CSS to be used in the input unit 1301 and the output unit 1302.

Each S(1×N) configuration CSS constituting the input unit 1301 includes one input port connected to the MCF having S core(s), and N(D) output port(s), each connected to the MCF having S core(s). And an optical signal propagated from a certain core including the input port (core number a) can be outputted to the core having the same core number a of any output MCF port. Specific configuration examples of the CSS are as described in Embodiments 1 to 11. The CSS being used in the output unit 1302 may be the same as the CSS being used in the input unit 1301.

Each of the number of S(1×N) configuration CSSs equal to the number of input/output routes (D=3 in FIG. 28) of the optical node device are arranged in the input side (the input unit 1301) and the output side (the output unit 1302) so that the optical node device of Embodiment 22 can transmit an optical signal propagated from the core having a certain input route (input MCF) to the core having the same core number of any output route (output MCF) of a switching destination. Further, the optical signal being inserted by the optical node device can be transmitted to the desired core of the desired output route (output MCF), and the optical signal propagated from the desired core of the desired input route (input MCF) can be branched and received.

The optical node device of Embodiment 22 includes D S(1×M) configuration CSS(s) and M 1×SD configuration CSS(s) in each of the insertion unit 1303 and the branch unit 1304. The S(1×M) configuration CSS is the CSS described in Embodiments 1 to 11 with N=M. The 1×SD configuration CSS is the CSS described in Embodiment 15 (FIG. 20) and Embodiment 20 (FIG. 26).

Each of the M 1×SD configuration CSSs in the insertion unit 1303 is connected to D output MCF(s), and each output MCF is connected to one S (1×M) configuration CSS of the D S(1×M) configuration CSS(s). The output MCF of each S(1×M) configuration CSS in the D S(1×M) configuration CSS(s) is connected to one S(1×N) CSS in the output unit 1302.

One output MCF of each S(1×N) CSS in the D S(1×N) configuration CSS(s) of the input unit 1301 is connected to one S(1×M) configuration CSS in the branch unit 1304. Each of the D S(1×M) configuration CSS(s) in the branch unit 1304 is connected to M output MCF(s). Each output MCF is connected to one 1×SD configuration CSS of the M 1×SD configuration CSS(s).

The light transmitted from the transmitter connected to the 1×SD configuration CSS of the insertion unit 1303 is outputted to the desired core of the MCF in the desired route. The light is inputted into the S(1×N) configuration CSS connected to the S(1×M) configuration CSS via the S(1×M) configuration CSS connected to the MCF in the desired route and is outputted from the S(1×N) configuration CSS. In the example of FIG. 28, the light from the transmitter travels along the path of "1×SD configuration CSS 1303-1→S(1×M) configuration CSS 1303-2→S(1×N) configuration CSS 1302-3".

The dropped light being inputted to the input unit 1301 is inputted from the S(1×N) configuration of the input unit 1301 into the desired 1×SD configuration CSS via the corresponding S(1×M) configuration CSS in the branch unit 1301 and is outputted to the receiver. In the example of FIG. 28, the dropped light travels along the path of "S(1×N) configuration CSS 1301-1→S(1×M) configuration CSS 1304-2→1×SD configuration CSS 1304-3" to be inputted to the receiver.

According to Embodiment 22, each of the transmitter and the receiver can access any core of any output MCF/input MCF without changing the connection. Further, no core competition occurs.

Summary of Embodiments

With the technology described above, a core selective switch can be implemented, which includes one input MCF port having S core(s) and N output MCF port(s) having S core(s), and outputs an optical signal propagated from the core including the input MCF port (core number a) to the core having the same core number a of any output MCF port. Further, an optical signal propagated from the core having a certain input route (input MCF) can be transmitted to the core having the same core number of any output route (output MCF). Further, the optical signal inserted by the optical node device can be transmitted to the desired core of the desired output route (output MCF). The optical signal propagated from the desired core of the desired input route (input MCF) of the optical node device can be branched and received.

The present specification discloses at least the core selective switch and the optical node device described in the following clauses.

(Clause 1) A core selective switch in an optical node device constituting a spatial channel optical network, the core selective switch comprising:
 a spatial demultiplexing unit;
 an optical switch; and
 an optical interconnect unit,
 wherein the spatial demultiplexing unit is an MCF collimator array in which a plurality of MCF collimators each comprising both an MCF having S cores and a collimator lens are two-dimensionally arranged in a plane,
 wherein the optical switch is a variable reflection angle mirror array in which S variable reflection angle mirrors are two-dimensionally arranged in a plane in a manner similar to a core arrangement in the MCF,
 wherein the optical interconnect unit is a steering lens arranged between the MCF collimator and the variable reflection angle mirror array, and
 wherein among a plurality of said MCFs in the MCF collimator array, a beam light output from each core of an input MCF is focused on a variable reflection angle mirror corresponding to the core to be reflected to couple to a corresponding core of a desired output MCF.

(Clause 2) The core selective switch according to clause 1 further comprising a variable optical attenuator configured to adjust an optical power to be inputted to each core of the output MCF of the plurality of MCFs.

(Clause 3) The core selective switch according to clause 1 or clause 2, wherein the MCF is configured by a single core fiber arranged two-dimensionally in a plane.

(Clause 4) The core selective switch according to clause 1 or clause 2, wherein the MCF is configured by a plurality of MCFs arranged two-dimensionally in a plane.

(Clause 5) A core selective switch in an optical node device constituting a spatial channel optical network, the core selective switch comprising:
  a spatial demultiplexing unit;
  an optical switch; and
  an optical interconnect unit,
  wherein the spatial demultiplexing unit is a waveguide converter array including a plurality of converters for connecting each core, to a single core waveguide, of an MCF having S cores, one of the plurality of converters being used as an input side converter and rest being used as an output side converter,
  wherein the optical switch includes S 1-input/multi-output optical switches,
  wherein the optical interconnect unit is a waveguide or an optical fiber, arranged between the output side converter and the S 1-input/multi-output optical switches,
  wherein a light outputted from an output port corresponding to each core of MCF in the input side converter, is switched, by the 1-input/multi-output optical switch corresponding to the core, to couple to corresponding core of MCF connected to a desired output side converter.

(Clause 6) The core selective switch according to clause 5 further comprising a variable optical attenuator arranged in each output or each input of the 1-input/multi-output optical switch.

(Clause 7) The core selective switch according to clause 5 or clause 6 further comprising an S×S optical switch arranged between S output port of the input side converter and S input port of the S 1-input/multi-output optical switch.

(Clause 8) An optical node device including an input unit, an output unit, an insertion unit, and a branch unit, the optical node device comprising:
  a core selective switch according to any one of clauses 1 to 7 being used in each of the input unit and output unit (Clause 9) A core selective switch in an optical node device constituting a spatial channel optical network, the core selective switch comprising:
  a spatial demultiplexing unit;
  an optical switch; and
  an optical interconnect unit,
  wherein the spatial demultiplexing unit is a fiber array in which an input SMF having a single core, and an output SMF bundle having S cores or D output MCFs having S cores are two-dimensionally arranged in a plane,
  wherein the optical switch is a variable reflection angle mirror of 2-axis rotation,
  wherein the optical interconnect unit is a steering lens arranged between the fiber array and the variable reflection angle mirror,
  wherein a beam light outputted from the input SMF is focused on the variable reflection angle mirror to be reflected to couple to a desired core of a desired output SMF bundle or output MCF.

(Clause 10) A core selective switch in an optical node device constituting a spatial channel optical network, the core selective switch comprising:
  a spatial demultiplexing unit;
  an optical switch; and
  an optical interconnect unit,
  wherein the spatial demultiplexing unit includes an MCF collimator array in which N input MCF collimators each comprising both an MCF having M cores connected to M input SMFs and a collimator lens, and D output MCF collimators each comprising both an MCF having S cores and a collimator lens are two-dimensionally arranged in a plane,
  wherein the optical switch includes a mirror array arranged two-dimensionally in a plane comprising MN variable reflection angle mirrors and a mirror array arranged two-dimensionally in a plane comprising SD variable reflection angle mirrors,
  wherein the optical interconnect unit includes a steering lens arranged between the input MCF collimator and the mirror array comprising the MN variable reflection angle mirrors, a steering lens arranged between the output MCF collimator array and the mirror array comprising the SD variable reflection angle mirrors, and a relay lens arranged between the two mirror arrays,
  wherein a beam light outputted from any input SMF is reflected to couple to a desired core of a desired output MCF by a variable reflection angle mirror constituting the optical switch.

(Clause 11) A core selective switch in an optical node device constituting a spatial channel optical network, the core selective switch comprising:
  a spatial demultiplexing unit;
  an optical switch; and
  an optical interconnect unit,
  wherein the spatial demultiplexing unit is a waveguide converter array including D output side converters for connecting each core, to a single core waveguide, of an MCF having S cores,
  the optical switch is an M-input/SD-output optical switches connected to M input SMFs,
  wherein the optical interconnect unit is a waveguide or an optical fiber, arranged between the waveguide converter array and the M-input/SD-output optical switches,
  wherein a light inputted from an input SMF into the M-input/SD-output optical switches is switched, by the M-input/SD-output optical switches, to couple to a desired core of MCF connected to a desired output side converter.

(Clause 12) An optical node device including an input unit, an output unit, an insertion unit, and a branch unit, the optical node device comprising:
  a core selective switch according to any one of clauses 9 to 11 being used in each of the insertion unit and branch unit Although the present embodiment has been described above, the present invention is not limited to such a specific embodiment, and various modifications and changes can be made within the scope of the gist of the present invention described in the claims.

This patent application claims its priority based on Japanese Patent Application No. 2019-034602 filed on Feb. 27, 2019. The entire contents of Japanese Patent Application No. 2019-034602 are incorporated herein by reference.

REFERENCE SIGNS LIST 1, 301,501,601,801,1301 input unit
2, 302, 502, 602, 802, 1302 output unit
3, 303, 503, 603, 803, 1303 insertion unit
4, 304, 504, 604, 804, 1304 branch unit

The invention claimed is:
1. A core selective switch in an optical node device included in a spatial channel optical network, the core selective switch comprising:
  a spatial demultiplexing unit;
  an optical switch; and
  an optical interconnect unit, wherein the spatial demultiplexing unit is a Multi Core Fiber (an MCF) collimator array in which a plurality of MCF collimators each comprising both an MCF having S cores and a collimator lens are two-dimensionally arranged in a plane, wherein the optical switch is a variable reflection angle mirror array in which an arrangement of S variable reflection angle mirrors is identical in shape to a core arrangement in the MCF, wherein the optical interconnect unit is a steering lens arranged between the MCF collimator array and the variable reflection angle mirror array, and wherein among a plurality of said MCFs in the MCF collimator array, a beam light output from each core of an input MCF is focused on a variable reflection angle mirror corresponding to the core to be reflected to couple to a corresponding core of a desired output MCF.

2. The core selective switch according to claim 1 further comprising a variable optical attenuator configured to adjust an optical power to be inputted to each core of an output MCF of the plurality of MCFs.

3. An optical node device including an input unit, an output unit, an insertion unit, and a branch unit, the optical node device comprising:
a core selective switch according to claim 1 being used in each of the input unit and output unit.

4. An optical node device including an input unit, an output unit, an insertion unit, and a branch unit, the optical node device comprising:
the core selective switch according to claim 1 being used in each of the input unit and output unit; and
a second core selective switch being used in each of the insertion unit and the branch unit;
wherein the second core selective switch comprises:
a spatial demultiplexing unit, an optical switch, and an optical interconnect unit,
wherein the spatial demultiplexing unit is a fiber array in which an input SMF having a single core and D output MCFs having S cores are two-dimensionally arranged in a plane,
wherein the optical switch is a variable reflection angle mirror of 2-axis rotation,
wherein the optical interconnect unit is a sole steering lens arranged between the fiber array and the variable reflection angle mirror a focal length of the steering lens is denoted as f, and the variable reflection angle mirror of 2-axis rotation is arranged at the distance f from the steering lens and the fiber array is arranged at the distance f from the steering lens to constitute a 2f optical system, and
wherein a beam light outputted from the input SMF is focused on the variable reflection angle mirror to be reflected to couple to a desired core of a desired output MCF.

5. A core selective switch in an optical node device included in a spatial channel optical network, the core selective switch comprising:
a spatial demultiplexing unit;
an optical switch; and
an optical interconnect unit,
wherein the spatial demultiplexing unit includes a Multi Core Fiber (an MCF) collimator array in which N input MCF collimators each comprising both an MCF having M cores connected to M input SMFs and a collimator lens, and D output MCF collimators each comprising both an MCF having S cores and a collimator lens are two-dimensionally arranged in a plane, wherein the optical switch includes a first mirror array comprising MN variable reflection angle mirrors and arranged two-dimensionally in a plane, and a second mirror array comprising SD variable reflection angle mirrors and arranged two-dimensionally in a plane, wherein the optical interconnect unit includes a first steering lens arranged between the input MCF collimator and the first mirror array comprising the MN variable reflection angle mirrors, a second steering lens arranged between the output MCF collimator array, and the second mirror array comprising the SD variable reflection angle mirrors, and a relay lens arranged between the two mirror arrays, and wherein a beam light outputted from any input SMF is incident through the first steering lens to the first mirror array, reflected by a mirror in the first mirror array, and incident through the relay lens to the second mirror array, reflected by a mirror in the second mirror array, to couple to a desired core of a desired output MCF.

6. An optical node device including an input unit, an output unit, an insertion unit, and a branch unit, the optical node device comprising:
a core selective switch in an optical node device included in a spatial channel optical network, the core selective switch comprising a spatial demultiplexing unit, an optical switch; and an optical interconnect unit,
wherein the spatial demultiplexing unit is an MCF collimator array in which a plurality of MCF collimators each comprising both an MCF having S cores and a collimator lens are two-dimensionally arranged in a plane,
wherein the optical switch is a variable reflection angle mirror array in which an arrangement of S variable reflection angle mirrors is identical in shape to a core arrangement in the MCF,
wherein the optical interconnect unit is a steering lens arranged between the MCF collimator array and the variable reflection angle mirror array, and
wherein among a plurality of said MCFs in the MCF collimator array, a beam light output from each core of an input MCF is focused on a variable reflection angle mirror corresponding to the core to be reflected to couple to a corresponding core of a desired output MCF, the core switch being used in each of the insertion unit and branch unit; and
a core selective switch according to claim 5 being used in each of the insertion unit and branch unit.

7. A core selective switch in an optical node device included in a spatial channel optical network, the core selective switch comprising:
a spatial demultiplexing unit;
an optical switch; and
an optical interconnect unit,
wherein the spatial demultiplexing unit is an SMF-bundle collimator array in which a plurality of SMF-bundle collimators are two-dimensionally arranged in a plane,
wherein each SMF-bundle collimator comprises both a plurality of SMFs and a collimator lens,
wherein the optical switch is a variable reflection angle mirror array in which an arrangement of a plurality of variable reflection angle mirrors is identical in shape to a core arrangement in the SMF-bundle
wherein the optical interconnect unit is a steering lens arranged between the SMF-bundle collimator array and the variable reflection angle mirror array, and wherein among the plurality of SMF-bundles in the SMF-bundle collimator array, a beam light output from each core of an input SMF-bundle is focused on a variable reflection angle mirror corresponding to the core to be reflected to couple to a corresponding core of a desired output SMF-bundle.

8. The core selective switch according to claim 7 further comprising a variable optical attenuator configured to adjust an optical power to be inputted to each core of an output SMF-bundle of the plurality of SMF-bundles.

9. A core selective switch in an optical node device included in a spatial channel optical network, the core selective switch comprising:
   a spatial demultiplexing unit;
   an optical switch; and
   an optical interconnect unit,
   wherein the spatial demultiplexing unit is an MCF collimator array in which a plurality of MCF collimators each comprising both T MCFs having S cores and a collimator lens are two-dimensionally arranged in a plane,
   wherein the optical switch is a variable reflection angle mirror array in which an arrangement of ST variable reflection angle mirrors is identical in shape to a core arrangement in the MCF collimator,
   wherein the optical interconnect unit is a steering lens arranged between the MCF collimator array and the variable reflection angle mirror array, and
   wherein among a plurality of said MCFs in the MCF collimator array, a beam light output from each core of an input MCF is focused on a variable reflection angle mirror corresponding to the core to be reflected to couple to a corresponding core of a desired output MCF.

* * * * *